United States Patent
Mirzaei et al.

(10) Patent No.: US 12,025,454 B1
(45) Date of Patent: Jul. 2, 2024

(54) LOCALIZATION OF USER(S) IN ENVIRONMENT(S)

(71) Applicant: GOODMAPS INC., Louisville, KY (US)

(72) Inventors: Fatemeh Mirzaei, Scotts Valley, CA (US); Nicholas J. Karels, Jr., Louisville, KY (US); Charlie Meredith, Louisville, KY (US)

(73) Assignee: GOODMAPS INC., Louisville, KY (US)

( * ) Notice: Subject to any disclaimer, the term of this patent is extended or adjusted under 35 U.S.C. 154(b) by 0 days.

(21) Appl. No.: 18/362,552

(22) Filed: Jul. 31, 2023

Related U.S. Application Data

(60) Provisional application No. 63/516,261, filed on Jul. 28, 2023.

(51) Int. Cl.
| | |
|---|---|
| *G01C 21/34* | (2006.01) |
| *G01C 21/36* | (2006.01) |
| *G06V 10/44* | (2022.01) |
| *G06V 20/52* | (2022.01) |

(52) U.S. Cl.
CPC ..... *G01C 21/3476* (2013.01); *G01C 21/3667* (2013.01); *G06V 10/443* (2022.01); *G06V 20/52* (2022.01)

(58) Field of Classification Search
CPC ............ G01C 21/3476; G01C 21/3667; G06V 10/443; G06V 20/52
See application file for complete search history.

(56) References Cited

U.S. PATENT DOCUMENTS

| | | | | |
|---|---|---|---|---|
| 11,113,894 | B1* | 9/2021 | Price | G06T 19/006 |
| 11,233,937 | B1* | 1/2022 | Solenberg | G05D 1/0274 |
| 2009/0296989 | A1* | 12/2009 | Ramesh | G06V 20/52 |
| | | | | 382/103 |
| 2021/0279953 | A1* | 9/2021 | Bouhnik | G06T 17/05 |
| 2021/0343087 | A1* | 11/2021 | Gomez Gonzalez | G06F 3/011 |
| 2022/0084290 | A1* | 3/2022 | Price | G01C 21/1656 |

OTHER PUBLICATIONS

Sarlin, Paul-Edouard, et al., From Coarse to Fine: Robust Hierarchical Localization at Large Scale, arXiv:1812.03506v2, 15 pages, dated Apr. 8, 2019.

* cited by examiner

*Primary Examiner* — Rami Khatib
(74) *Attorney, Agent, or Firm* — Gray Ice Higdon

(57) ABSTRACT

Implementations described herein relate to various techniques for localization of user(s) in environment(s). In particular, processor(s) can utilize a multi-scan technique, a semantic segmentation technique, or a combination of these techniques. In utilizing the multi-scan technique, the processor(s) can initially determine a subset of candidate maps that are predicted to correspond to an environment of a user, and from a superset of candidate maps. Further, the processor(s) can obtain vision data that captures the environment, process the vision data to determine a narrower subset of candidate maps and to determine a given map, from the narrower subset of candidate maps corresponding to the environment. In utilizing the semantic segmentation technique, the processor(s) can additionally, or alternatively, determine semantic properties of the environment. The semantic properties can be utilized to initially constrain the subset of candidate maps and/or utilized in subsequently determining the given map.

24 Claims, 9 Drawing Sheets

LOCALIZATION OF USER(S) IN ENVIRONMENT(S)

BACKGROUND

Various localization techniques have been proposed that can aid humans (referred to herein as "users") in determining an environment in which they are located, identifying points of interest in the environment in which they are located, navigating through the environment, etc. For example, many users have client devices, such as smartphones, that are equipped with GPS sensor(s) and/or other location sensor(s). These users can interact with various software applications (e.g., via their client devices) that leverage sensor data generated by the GPS sensor(s) and/or other location sensor(s) of the smartphones. For instance, a user can interact with a navigational software application that leverages this sensor data to determine the user's current location, identify businesses or other points of interest that are near the user's current location, provide directions to a desired business and/or other point of interest specified by the user, and so on. However, current localization techniques suffer from one or more drawbacks.

As one example, most localization techniques are limited to determining a user's location with respect to a global frame of reference. For instance, most localization techniques determine a user's location with respect to longitude and latitude or with respect to particular location identifiers (e.g., street addresses, plus codes, etc.). However, the user's location with respect to a global frame of reference is insufficient in aiding the user in many instances, such as when the user's location is within a multi-story building where the user's longitude and latitude can be the same for each story of the multi-story building. As another example, some localization techniques determine a user's location with respect to a local frame of reference. For instance, some localization techniques utilize vision-based machine learning (ML) techniques to analyze vision data capturing an environment of the user, compare features captured in the vision data to features of maps that were previously generated for a plurality of different environments, and determine the environment of the user based on the comparing. However, these vision-based ML techniques are computationally intensive. Accordingly, there is a need in the art for localization techniques that mitigate and/or obviate these drawbacks.

SUMMARY

Implementations described herein relate to various techniques for localization of user(s) in environment(s). In particular, processor(s) can utilize a multi-scan technique, a semantic segmentation technique, or a combination of these techniques as described herein. In some implementations, the processor(s) may only utilize the multi-scan technique in localization of user(s) in environment(s). In utilizing only the multi-scan technique localization of user(s) in environment(s), the processor(s) can determine a subset of candidate maps, from among a superset of candidate maps, that are predicted to correspond to an environment of a user of a client device; obtain vision data that captures the environment of the user and that is generated by vision component(s) of the client device of the user; determine, based on processing the vision data that captures the environment of the user, and from among the subset of candidate maps, a given map corresponding to the environment of the user; and cause the given map corresponding to the environment of the user to be utilized as an operational map.

In some versions of those implementations, and in determining the subset of candidate maps that are predicted to correspond to the environment of the user, and from among the superset of candidate maps, the processor(s) may obtain location data generated by location sensor(s) of the client device. Further, the processor(s) may determine the subset of candidate maps based on the location data. For example, the superset of candidate maps may include all previously generated maps that are associated with a plurality of different buildings. However, the location data may indicate that the user has entered a particular building. In this example, the subset of candidate maps can include all of the maps that are associated with the particular building, surrounding buildings, and outdoor environment(s) around the particular building. In this manner, the processor(s) can initially leverage the location data to initially constrain the superset of candidate maps to only those that are relevant to the user at the time the location data is obtained. In some further versions of those implementations, the processor(s) may only obtain the location data generated by the location sensor(s) of the client device in response to a software application, that is accessible by the client device, being launched. In these implementations, the software application may be leveraged in localization of the user(s) in the environment(s).

In additional or alternative versions of those implementations, and in determining the subset of candidate maps that are predicted to correspond to the environment of the user, and from among the superset of candidate maps, the processor(s) may obtain user input via a software application, that is accessible by the client device and that is leveraged in localization of the user(s) in the environment(s). Further, the processor(s) may determine the subset of candidate maps based on the user input. For example, the user can specify, by directing typed or spoken input to the software application, that they have entered a particular building. In this example, the subset of candidate maps can include all of the maps that are associated with the particular building, surrounding buildings, and outdoor environment(s) around the particular building. In this manner, the processor(s) can initially leverage the user input to initially constrain the superset of candidate maps to only those that are relevant to the user at the time the user input is obtained.

In additional or alternative versions of those implementations, and in determining the subset of candidate maps that are predicted to correspond to the environment of the user, and from among the superset of candidate maps, the processor(s) may obtain building classification vision data generated by the vision component(s) of the client device. Further, the processor(s) may determine the subset of candidate maps based on processing the building classification vision data. For example, the processor(s) may process, using a building classifier, the building classification vision data to determine that a building in the environment of the user corresponds to a particular building. In this example, the subset of candidate maps can include all of the maps that are associated with the particular building, surrounding buildings, and outdoor environment(s) around the particular building. In this manner, the processor(s) can initially leverage the building classification vision data to initially constrain the superset of candidate maps to only those that are relevant to the user at the time the building classification vision data is obtained. In some further versions of those implementations, the processor(s) may only obtain the building classification vision data generated by the vision component(s) of the client device in response to a software application, that is accessible by the client device, being launched. In these implementations, the software application may be leveraged in localization of the user(s) in the environment(s).

In some versions of those implementations, and in determining the given map corresponding to the environment of the user based on processing the vision data that captures the environment of the user, and from among the subset of candidate maps, the processor(s) may process, using machine learning (ML) model(s), the vision data to generate output. Further, the processor(s) may determine, based on at least a portion of the output, and from among the subset of candidate maps, a narrower subset of candidate maps. Moreover, the processor(s) may determine, based on at least an additional portion of the output, and from among the narrower subset of candidate maps, the given map corresponding to the environment of the user. In some further versions of those implementations, the processor(s) may only determine the given map corresponding to the environment of the user based on at least an additional portion of the output when the narrower subset of candidate maps includes multiple maps. Put another way, the processor(s) may forgo any additional processing when the narrower subset of maps only includes a single map.

For example, assume that the ML model(s) include a feature extraction model that is trained to process the vision data to generate the output. In this example, the feature extraction model may be, for example, a convolutional neural network (CNN(s)) and/or other vision-based ML model(s). Further, the output may be generated in a "one shot" manner using the feature extraction model and may include, for example, global features of the environment that are extracted from the vision data, local features of the environment that are extracted from the vision data, and/or keypoint detection scores that are associated with the global features of the environment and/or that are associated with the local features of the environment. In this example, the portion of the output utilized by the processor(s) to determine the narrower subset of candidate maps, from among the subset of candidate maps, may include the global features of the environment that are extracted from the vision data and/or the keypoint detection scores that are associated with the global features of the environment. Further, the additional portion of the output utilized by the processor(s) to determine the given map, from among the narrower subset of candidate maps, may include the local features of the environment that are extracted from the vision data and/or the keypoint detection scores that are associated with the local features of the environment.

For instance, assume that a user enters a particular building and that the particular building is a 10-story building. Further assume that there is a corresponding map for each floor story building. In this instance, the subset of candidate maps initially determined prior to obtaining the vision data may include at least 10 maps—one for each floor of the building. Notably, the subset of candidate maps may omit other maps that are not associated with the building or a surrounding building (e.g., omits maps of buildings that are beyond a certain radius of the user, such as one mile away or five miles away). Further assume that based on processing the global features extracted from the vision data (and optionally the keypoint detection scores associated with the global features), the processor(s) determine that the narrower subset of candidate maps only includes 3 maps from among of those 10 maps (e.g., based on processing the global features using a rough feature matching algorithm or model, such as a k-nearest neighbors (kNN) algorithm, one or more distance functions to determine a distance between the global features and stored global features of previously generated map(s), a hierarchical keypoint detection score matching technique, or another rough feature matching algorithm or model). Further assume that based on processing the local features extracted from the vision data (and optionally the keypoint detection scores associated with the local features), the processor(s) select 1 map from among those 3 maps (e.g., based on processing the local features using a fine feature matching algorithm or model, such as structure from motion (SfM) model, a visual simultaneous localization and mapping (visual SLAM) algorithm, or another fine feature matching algorithm or model).

Notably, the "fine" feature matching algorithm or model utilized to process at least the local features can be considered "fine" relative to the "rough" feature matching algorithm or model utilized to process the global features in that the "fine" feature matching algorithm or model compares a greater quantity of features to the stored features of the previously generated map(s) relative to the "rough" feature matching algorithm or model, whereas the "rough" feature matching algorithm or model compares a lesser quantity of features to the stored feature(s) of the previously generated map(s) relative to the "fine" feature matching algorithm or model.

Notably, processing the local features (e.g., using the fine feature matching algorithm or model) may be more computationally intensive as compared to processing the global features (e.g., using a rough feature matching algorithm or model). The processing of the local features may be more computationally that the processing of the global features since the local features may be of increased dimensionality as compared to the local features (e.g., increased embedding size, increased vector size, etc.). Accordingly, by narrowing the candidate maps to the subset of 10 maps, then to the narrower subset of 3 maps, and then performing the more computationally intensive process on only the narrower subset of 3 maps (hence the term "multi-scan" technique), computational resources can be conserved since the more computationally intensive process is not performed on the subset of 10 maps. Moreover, and assuming that the narrower subset only includes 1 map, the more computationally intensive process can be omitted altogether, thereby conserving even more computational resources in comparison with the above instance.

In some versions of those implementations, and in causing the given map corresponding to the environment of the user to be utilized as an operational map, the processor(s) may cause a software application, that is accessible by the client device, to provide the user with navigational directions from a current location of the user in the environment and to a given point of interest in the environment that is specified by the user via the software application. For example, assume the environment corresponds to a terminal of an airport and that the given point of interest corresponds to a gate at which the user is boarding a flight. In this example, the navigational directions can be from the current location of the user to the gate.

In additional or alternative versions of those implementations, and in causing the given map corresponding to the environment of the user to be utilized as an operational map, the processor(s) may cause a software application, that is accessible by the client device, to provide the user with information related to a plurality of points of interest in the environment. For example, again assume the environment corresponds to a terminal of an airport. In this example, the plurality of points of interest can include information centers, shops, restaurants, etc. Further, the information can identify names associated with these points of interest, resources that can be obtained from these points of interest, bounding boxes around these points of interest, and/or any other information related to these points of interest that can be assigned in generating the given map.

In additional or alternative implementations, the processor(s) may only utilize the semantic segmentation technique in localization of user(s) in environment(s). In utilizing only the semantic segmentation technique in localization of user(s) in environment(s), the processor(s) can obtain vision data that captures an environment of a user of a client device and that is generated by vision component(s) of the client device of the user; process, using ML model(s), the vision data to determine one or more semantic properties of the environment of the user; determine, based on one or more of the semantic properties of the environment of the user, a given map, and from among a superset of candidate maps, corresponding to the environment of the user; and cause the given map corresponding to the environment of the user to be utilized as an operational map.

In some versions of those implementations, the ML model(s) may include, for example, an edge detection ML model, an objection detection ML model, an object classification ML model, a door detection ML model, a lux detection ML model, a contrastive language-image pre-training (CLIP) model, and/or a visual language model (VLM). Notably, the one or more semantic properties of the environment of the user determined based on processing the vision data may be dependent on the ML model(s) that are utilized to process the vision data. As some non-limiting example, the one or more semantic properties may include edges detected in the environment of the user by the edge detection ML model; objects detected in the environment by the object detection ML model; sizes and/or orientations of the objects detected in the environment of the user by the object detection ML model, CLIP model, or VLM; classifications of the objects detected in the environment of the user by the object classification model, CLIP model, or VLM; one or more doors detected in the environment of the user by the door detection model, CLIP model, or VLM; sizes and/or orientations of the one or more doors detected in the environment of the user by the door detection model, CLIP model, or VLM; a quantity of the one or more doors detected in the environment of the user by the door detection model, CLIP model, or VLM; a lux of one or more lights in the environment of the user by the lux detection model; and/or other semantic properties detected by one or more of the aforementioned ML model(s) and/or other ML model(s).

Notably, one or more of these semantic properties can be utilized by the processor(s) to determine the given map corresponding to the environment of the user, and without having to process global features of the environment of the user, local features of the environment of the user, and/or keypoint detection scores for the global features of the environment of the user and/or for the local features of the environment of the user. For example, assume that the vision data is processed and the processor(s) determine that multiple doors are detected in the environment of the user, that each of the doors have a corresponding width and a corresponding height or is a particular type of door (e.g., a sliding door, a revolving door, an arched door, etc.), and that the multiple doors are arranged in a particular configuration where a first door, of the multiple doors, faces east and a second door, of the multiple doors, faces south. In this example, the given map may be stored in association with one or more stored semantic properties that indicate the given map includes a particular unique configuration of doors and their locations, and that this particular unique configuration is a sufficient signal to determine that the environment of the user corresponds to the given map. Accordingly, the processor(s) may determine that the given map corresponds to the environment of the user, and from among the superset of candidate maps, based on the multiple doors alone, and without having to process the global features of the environment of the user, the local features of the environment of the user, and/or the keypoint detection scores for the global features of the environment of the user and/or for the local features of the environment of the user (hence the phrase "semantic segmentation" technique).

As another example, assume that the vision data is processed, and the processor(s) determine a lux of one or more lights in the environment of the user or a light frequency emitted by one or more of the lights in the environment of the user. In this example, the given map may be stored in association with one or more stored semantic properties that indicate the given map includes the one or more lights having a particular lux and/or particular light frequency, and that the particular lux and/or the particular light frequency is a sufficient signal to determine that the environment of the user corresponds to the given map. Accordingly, and similar to the above example, the processor(s) may determine that the given map corresponds to the environment of the user, and from among the superset of candidate maps, based on the particular lux and/or the particular light frequency alone, and without having to process the global features of the environment of the user, the local features of the environment of the user, and/or the keypoint detection scores for the global features of the environment of the user and/or for the local features of the environment of the user.

In some versions of those implementations, and in response to the processor(s) failing to determine the given map that corresponds to the environment of the user based on the one or more semantic properties, the processor(s) can default to the multi-scan technique (e.g., as described above). In some versions of those implementations, the processor(s) can utilize the location data obtained via the location sensor(s) of the client device, the user input obtained via the software application, and/or the building classification obtained via the building classifier (e.g., as described above with respect to the multi-scan technique) to determine a subset of candidate maps, from among the superset of candidate maps, prior to comparing the one or more semantic properties determined based on processing the vision data to one or more stored semantic properties. In this manner, the processor(s) can initially constrain the superset of candidate maps to only those that are relevant to the user (e.g., the subset of candidate maps) at the time the one or more semantic properties are determined.

In additional or alternative implementations, the processor(s) may utilize aspects of both the multi-scan technique and the semantic segmentation technique in localization of user(s) in environment(s). In some versions of those implementations, one or more semantic properties may be utilized to constrain the superset of candidate maps to only those that are relevant to the user (e.g., the subset of candidate maps) at the time the one or more semantic properties are determined. For example, assume that vision data is processed and the processor(s) determine that multiple doors are detected in the environment of the user, that each of the doors have a corresponding width and a corresponding height or is a particular type of door (e.g., a sliding door, a revolving door, an arched door, etc.), and that the multiple doors are arranged in a particular configuration where a first door, of the multiple doors, faces east and a second door, of the multiple doors, faces south. In this example, the subset of candidate maps can be limited to those having the multiple doors with the corresponding widths, the corresponding heights, the corresponding orientations, etc. The processor(s) can then implement the remaining aspects of the multi-scan technique to determine the given map.

In additional or alternative versions of those implementations, one or more semantic properties may be utilized to determine the given map from among the narrower subset of candidate maps. For example, assume that vision data is processed and the processor(s) determine that the narrower subset includes five maps but that multiple doors are detected in the environment of the user, that each of the doors have a corresponding width and a corresponding height or is a particular type of door (e.g., a sliding door, a revolving door, an arched door, etc.), and that the multiple doors are arranged in a particular configuration where a first door, of the multiple doors, faces east and a second door, of the multiple doors, faces south. In this example, the processor(s) can determine that one of the five candidate maps in the narrower subset having the multiple doors with the corresponding widths, the corresponding heights, the corresponding orientations, etc. is the given map.

By using techniques described herein one or more technical advantages can be achieved. As one non-limiting example, and in implementing the multi-scan technique, computational resources can be conserved by progressively narrowing the different subsets of candidate maps by considering the different features of the environment to ensure the more computationally intensive process (e.g., the processing of the local features of the environment) is only performed on the candidate maps that are most likely to correspond to the environment of the user and/or eliminated altogether. As another non-limiting example, and in implementing the semantic segmentation technique (alone and/or in combination with the multi-scan technique), computational resources can additionally, or alternatively, be conserved by considering the semantic properties of the environment to ensure the more computationally intensive process (e.g., the processing of the local features of the environment) is only performed on the candidate maps that are most likely to correspond to the environment of the user and/or eliminated altogether.

The above description is provided as an overview of only some implementations disclosed herein. Those implementations, and other implementations, are described in additional detail herein. Further, it should be understood that techniques disclosed herein can be implemented by processor(s) locally on a client device, remotely by server(s) connected to the client device via one or more networks, and/or both.

DETAILED DESCRIPTION

Figure 1:
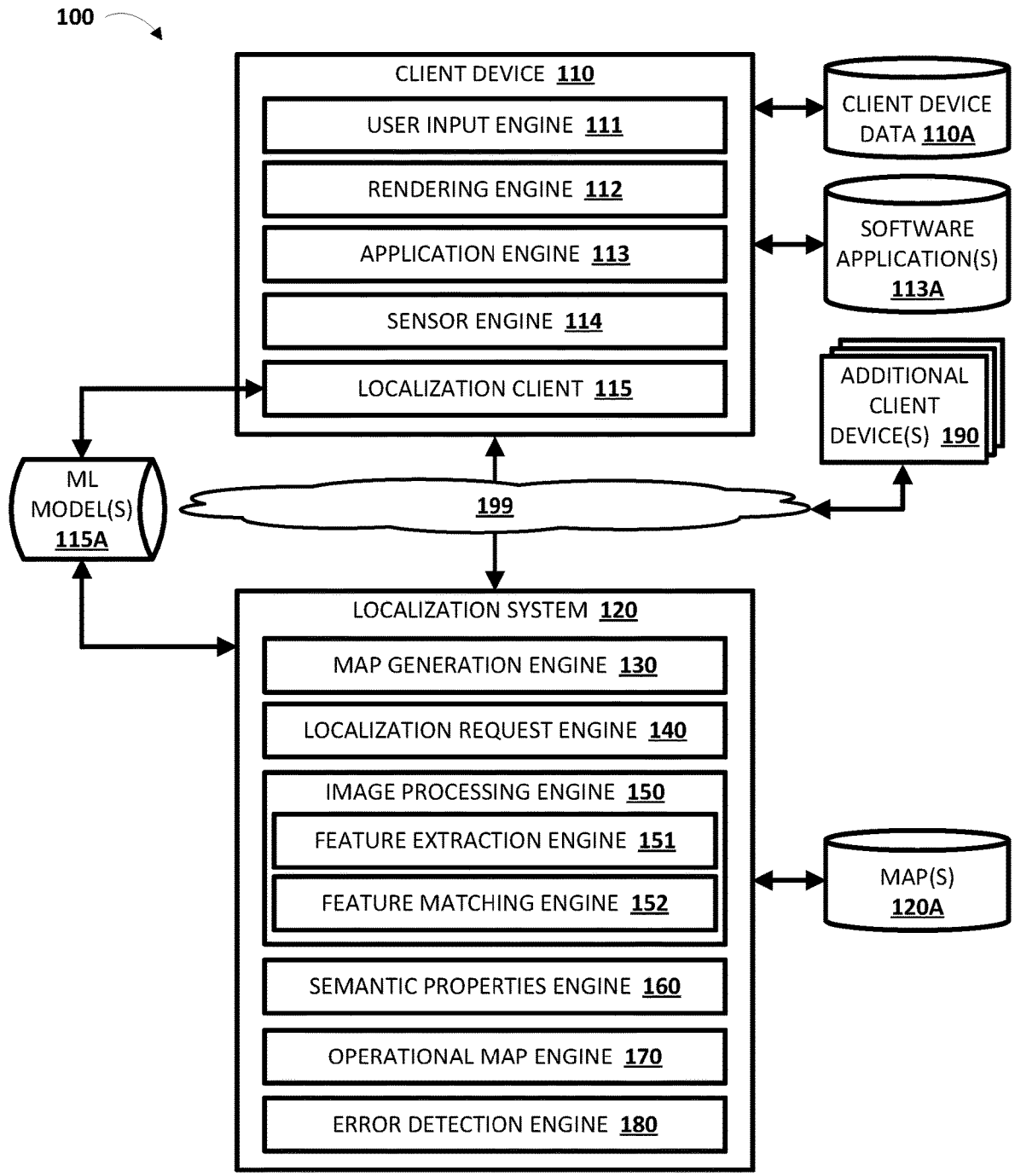
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a localization system 120. In some implementations, the localization system 120 can be implemented locally at the client device 110. In additional or alternative implementations, the localization system 120 can be implemented remotely from the client device 110 as depicted in FIG. 1 (e.g., at remote server(s) at a physical location of the user of the client device 110 but remote from the client device 110, at remote server(s) that are remote from the physical location of the user of the client device 110). In these implementations, the client device 110 and the localization system 120 may be communicatively coupled with each other via one or more networks 199, such as one or more wired or wireless local area networks ("LANs," including Wi-Fi networks, mesh networks, Bluetooth networks, near-field communication networks, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute a localization client 115. An instance of the localization client 115 can be a software application that is separate from an operating system of the client device 110 (e.g., installed "on top" of the operating system)—or can alternatively be implemented directly by the operating system of the client device 110. The localization client 115 can interact with the localization system 120 implemented locally at the client device 110 or via one or more of the networks 199 as depicted in FIG. 1 when the localization system 120 is remote from the client device 110.

In various implementations, the client device 110 may include a user input engine 111 that is configured to user input(s) provided by a user of the client device 110 via or more user interface input devices. For example, the client device 110 may be equipped with one or more microphones that capture audio data, such as audio data corresponding to spoken utterances of the user or other sounds in an environment of the client device 110. The audio data can be processed using various components of the client device 110 and/or the localization system 120 to identify content included in the spoken utterance (e.g., using automatic speech recognition (ASR) model(s), natural language understanding (NLU) model(s), large language model(s), etc.). Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to typed and/or touch input directed to the client device 110.

In various implementations, the client device 110 may include a rendering engine 112 that is configured to render content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or connected to another client device that includes a display or projector that enables content to be provided for visual presentation to the user via the client device 110. In some implementations, content may be visually rendered in a streaming manner at the client device 110 (e.g., as described with respect to FIGS. 7A and 7B).

In various implementations, the client device 110 may include an application engine 113 that is configured to execute various software applications. In some implementations, one or more of the software applications can be installed locally at the client device 110 as indicated by software application(s) database 113A. In additional or alternative implementations, one or more of the software applications can be hosted remotely (e.g., by server(s)) and can be accessible by the client device 110 over one or more of the networks 199. As described herein (e.g., with respect to FIGS. 7A and 7B), one or more software applications that are accessible by the client device 110 can leverage data generated locally at the client device 110 (e.g., location data, vision data, user input data, and/or other data described herein) in localization of user(s) in environment(s).

In various implementations, the client device 110 may include a sensor engine 114 that is configured to obtain sensor data generated by sensor(s) of the client device 110. As some non-limiting examples, the sensor(s) of the client device 110 may include vision component(s) (e.g., RGB camera(s), 2D camera(s), 2.5D camera(s), 3D camera(s), LiDAR sensor(s), etc.), location sensor(s) (e.g., GPS sensor(s), RFID sensor(s), NFC sensor(s)), gyroscope(s), accelerometer(s), motion sensor(s), inertial measurement unit(s) (IMU(s)), altimeter(s), and/or other sensors. Notably, the sensor engine 114 may obtain the sensor data directly from the corresponding sensors of the client device 110 or via an application programming interface (API) of the client device 110 that is provided by a manufacturer of the client device 110.

In various implementations, the client device 110 and/or the localization system 120 may include memory and/or other storage devices for storage of data and/or software applications. Further, the client device 110 and/or the localization system 120 may include one or more processors for accessing data and/or executing the software applications. Moreover, the client device 110 and/or the localization system 120 may include other components that facilitate communication over one or more of the networks 199, such as one or more network interfaces. The client device 110 and/or the localization system 120 may include other components (e.g., as described with respect to FIG. 8).

As depicted in FIG. 1, the localization system 120 may include a map generation engine 130, a localization request engine, an image processing engine 150, a semantic properties engine 160, an operation map engine 170, and an error detection engine 180. One or more of these various engines of the localization system 120 may include sub-engines. For example, the image processing engine 150 may include a feature extraction engine 151 and a feature matching engine 152. Although particular engines and sub-engines are depicted in FIG. 1, it should be understood that is for the sake of example and to illustrate aspects of techniques described herein, and is not meant to be limiting. For example, various engine and/or sub-engines can be added, combined, and/or omitted.

As described herein, the client device 110 and/or the localization system 120 may be utilized to localize user(s) in environment(s). However, prior to the client device 110 and/or the localization system 120 being utilized to localize user(s) in environment(s), map(s) of the environment(s) need to be generated and stored in map(s) database 120A. Accordingly, in various implementations, the map generation engine 130 may be configured to generate the map(s) of the environment(s) and store the map(s) in the map(s) database 120A.

In some versions of those implementations, vision data may be obtained via vision component(s) while a user (e.g., the user of the client device 110 or another user of additional client device(s) 191) traverses through a given environment. In these implementations, a given map corresponding to the given environment can be generated based on the vision data obtained while the user traverses through the given environment. For example, assume that the user enters a multi-story building and begins walking throughout a first floor of the building. In this example, as the user is walking throughout the first floor of the building, the vision components can capture the vision data that is utilized to generate a map for the first floor of the building. For instance, the vision components may include a LiDAR sensor(s) that generate LiDAR data as the vision data, and the LiDAR data can be constructed into a 3D point cloud and/or a 2D or 3D floor plan, thereby generating the map for the first floor of the building (e.g., as the 3D point cloud, the 2D floor plan, or the 3D floor plan). The map for the first floor of the building can be generated based on additional data as well (e.g., pose data, inertial measurement unit (IMU) data, other vision data from RGB camera(s) and/or other camera(s), and/or other data). The user can walk throughout the remaining floors of the building to generate corresponding maps for each of the remaining floors of the multi-story building in the same or similar manner.

In additional or alternative versions of those implementations, vision data may be obtained via vision component(s) while a robot autonomously or semi-autonomously traverses through a given environment. Similarly, in these implementations, a given map corresponding to the given environment can be generated based on the vision data obtained while the robot traverses through the given environment. For example, assume that the robot is placed in a multi-story building and begins autonomously or semi-autonomously navigating throughout a first floor of the building. In this example, as the robot navigates throughout the first floor of the building, the vision components can capture the vision data that is utilized to generate a map for the first floor of the building. The map for the first floor of the building may be generated in the same or similar manner described above, and the robot can navigate throughout the remaining floors of the building to generate corresponding maps for each of the remaining floors of the multi-story building in the same or similar manner.

In some versions of those implementations, and subsequent to generating the map(s) (e.g., based on the user traversing through the environment(s) and/or based on the robot navigating through the environment(s)), the map(s) may be augmented by information related to points of interest in the environment(s). Continuing with the above example, any points of interest for the first floor of the building can be labeled, various levels of information about the points of interest for the first floor of the building can be provided, semantic properties about various points of interest for the first floor of the building can be provided, one or more obstacles in the first floor of the building can be identified and magnified or otherwise demarcated, adjacent map(s) can be identified and included in the map(s) and/or the relationship of the adjacent map(s) (e.g., same floor of a building, same zone of a building, etc.) can be identified and included in the map(s), and/or otherwise augmented.

For instance, assume that the multi-story building from the above example is a museum. In this instance, the points of interest that are labeled can include an information booth, bathrooms, elevators, escalators, stairs, cafes, gift shops, artifacts or exhibits, and/or other points of interest. Further, the information booth can be augmented with services that the information booth may provide (e.g., guided tours, accessibility assistance, etc.); the bathrooms can be augmented with different genders; the elevators, stairs, and escalators can be augmented with information about where they can take users; the cafes and gift shops can be augmented with information such as menus and prices of menu items, gifts for sale and prices of the gifts for sale; and the artifacts or exhibits can be augmented with information related to the artifacts or exhibits such as origin information, historical information, and/or other information. Notably, this information may be dynamically presented to users as they traverse through the environment (e.g., as described with respect to FIGS. 7A and 7B). Moreover, any obstacles in the environment may also be considered points of interest. For instance, further assume that the museum has a fountain, benches, or the like. In this example, these obstacles may also be labeled, magnified, or the like to ensure that if the user(s) subsequently utilize the map corresponding to the first floor of the multi-story building for navigation purposes, that the user(s) are aware of the locations of those obstacles.

Although the above example describes the environment as being an indoor environment, it should be understood that is for the sake of example and is not meant to be limiting. Rather, it should be understood that techniques described herein can additionally, or alternatively, be utilized to generate map(s) of outdoor environments, such as parks, streets, parking garages, stadiums, ticket stations, and/or other outdoor environments. Further, although the above example is described with respect to the map corresponding to the first floor of the multi-story building, it should be understood that is also for the sake of example and is not meant to be limiting. Rather, it should be understood that the map can cover each floor of the multi-story building, a subset of the multiple floors of the multi-story building, a portion of the first floor of the multi-story building, a portion of an outdoor environment that surrounds the building, and/or other aspects in the environment. Moreover, although the above example includes particular points of interest, it should be understood that is also for the sake of example and is not meant to be limiting. Rather, it should be understood that the points of interest may be dependent on the environment and that the points of interest and information associated therewith are virtually limitless.

In various implementations, the localization request engine 140 may be configured to generate one or more requests for map(s) corresponding to environment(s) of user(s) and/or handle one or more of the requests for the map(s) corresponding to the environment(s) of the user(s). The one or more requests can include, for example, pre-warm requests, batch requests, and/or other requests. In some implementations, a pre-warm request may include, for example, building identifiers for any buildings that are locationally proximate to the client device 110 (e.g., determined based on location data generated by location sensor(s) of the client device 110), building identifiers for any buildings that are recognized based on processing vision data generated by vision component(s) of the client device 110 (e.g., determined based on processing the vision data using a building classifier that is trained to recognize buildings for which maps have been previously generated), building identifiers for any buildings that are specified by a user of the client device 110 (e.g., determined based on user input received via a software application that is accessible by the client device 110), and/or other information. Accordingly, when the localization system 120 subsequently obtains vision data to localize the user of the client device 110, the localization request engine 140 can ensure that the localization system 120 is up and running, and ensure that the localization system 120 has some prior knowledge of which maps to consider in localizing the user of the client device 110.

In some implementations, a batch request may include, for example, vision data that is captured by vision component(s) of the client device 110 and that is to be utilized in localizing the user of the client device 110, a request to localize the user of the client device 110, the building identifiers that were included in the pre-warm request, and/or other information. Accordingly, when the localization system 120 obtains the batch request, the localization system 120 can leverage information that was included in the pre-warm request to localize the user of the client device 110 based on the vision data that is included in the batch request. The pre-warm requests and batch requests are described in more detail herein (e.g., with respect to FIG. 2).

In various implementations, the image processing engine 150 may be configured to process vision data generated by vision component(s) of the client device 110 to localize the user of the client device 110. The vision data that is processed to localize the user of the client device 110 may be included in a batch request. As described in more detail herein (e.g., with respect to FIGS. 3-6), the feature extraction engine 151 can initially process, using vision-based machine learning (ML) model(s) stored in ML model(s) database 115A (e.g., convolutional neural network(s) and/or other vision-based ML model(s) that are capable of extracting vision data features from vision data), the vision data to generate output. The output may include different portions, such as global features of an environment of the user, local features of the environment of the user, and/or keypoint detection for the global features of the environment of the user and/or local features of the environment of the user. These different portions of the output may correspond to outputs generated by different heads of the vision-based ML model in a "one shot" approach (e.g., a single pass of the vision data over the ML model). Based on the output, the image processing engine 150 can determine a given map, from among a superset of candidate maps stored in the map(s) database 120A, that corresponds to the environment of the user and that is to be utilized as an operational map for the environment of the user.

In some versions of those implementations, the local features of the environment may be of increased dimensionality as compared to the global features of the environment. For example, the global features of the environment may include one or more embeddings of a first size or one or more vectors of a first size. Further, the local features of the environment may include one or more embeddings of a second size or one or more vectors of a second size. In this example, the second size may be larger than the first size, which is why the local features of the environment are of increased dimensionality as compared to the global features of the environment. This may be a result of, for instance, the global features of the environment being generated based on a single convolution over the entirety vision data (e.g., an image), but the local features of the environment being generated based on multiple convolutions over the entirety of the vision data (e.g., the image) or multiple convolutions over different portions of the vision data (e.g., different portions of the image).

Accordingly, in determining the given map that corresponds to the environment of the user, the feature matching engine 152 may initially process at least a portion of the output generated using the vision-based ML model (e.g., the global features of the environment) using a first feature matching algorithm or model (e.g., a rough feature matching algorithm or model, such as a k-nearest neighbors (kNN) algorithm, one or more distance functions to determine a distance between the global features and stored global features of previously generated map(s), or a hierarchical keypoint detection score matching technique) in an attempt to determine the given map without having to process at least an additional portion of the output generated using the vision-based ML model (e.g., the local features of the environment) using a second feature matching algorithm or model (e.g., a fine feature matching algorithm or model, such as structure from motion (SfM) model, a visual simultaneous localization and mapping (visual SLAM) algorithm, or another fine feature matching algorithm or model). Put another way, the feature matching engine 152 may only selectively utilize the local features of the environment in implementations when the processing of the global features of the environment does not result in a determination of the given map that corresponds to the environment, thereby conserving computational resources in determining the given map that corresponds to the environment of the user.

In various implementations, the semantic properties engine 160 may be configured to determine one or more semantic properties of the environment of the user. As described in more detail herein (e.g., with respect to FIGS. 4-6), the one or more semantic properties may be utilized in lieu of, or in addition to, the image processing engine 150 in determining the given map, from among a superset of candidate maps stored in the map(s) database 120A, that corresponds to the environment of the user and that is to be utilized as an operational map for the environment of the user. In determining the one or more semantic properties of the environment of the user, the semantic properties engine 160 may process, using one or more ML model(s) stored in the ML model(s) database 115A, vision data generated by vision component(s) of the client device 110 to determine the one or more semantic properties. The one or more ML models utilized to determine the one or more semantic properties can include, for example, an edge detection ML model, an objection detection ML model, an object classification ML model, a door detection ML model, a lux detection ML model, a contrastive language-image pre-training (CLIP) model, a visual language model (VLM), and/or other ML model(s). Notably, the one or more semantic properties may be dependent on the one or more ML models that are utilized to process the vision data.

As some non-limiting example, the one or more semantic properties may include edges detected in the environment of the user by the edge detection ML model; objects detected in the environment by the object detection ML model; sizes and/or orientations of the objects detected in the environment of the user by the object detection ML model, CLIP model, or VLM; classifications of the objects detected in the environment of the user by the object classification model, CLIP model, or VLM; one or more doors detected in the environment of the user by the door detection model, CLIP model, or VLM; sizes and/or orientations of the one or more doors detected in the environment of the user by the door detection model, CLIP model, or VLM; a quantity of the one or more doors detected in the environment of the user by the door detection model, CLIP model, or VLM; a lux of one or more lights in the environment of the user by the lux detection model; and/or other semantic properties detected by one or more of the aforementioned ML model(s) and/or other ML model(s).

In various implementations, the operational map engine 170 may be configured to cause the given map, determined based on the processing by the image processing engine 150 and/or the semantic properties engine 160, to be utilized as an operational map for the environment of the user. In some versions of those implementations (e.g., and as described with respect to FIG. 7A), the operational map engine 170 may utilize the operational map to provide the user of the client device 110 with information about points of interest in the environment of the user (e.g., information that was utilized to augment the given map as described with respect to the map generation engine 130). In additional or alternative versions of those implementations (e.g., and as described with respect to FIG. 7B), the operational map engine 170 may utilize the operational map to provide the user of the client device 110 with navigational directions to navigate the environment of the user (e.g., information that was utilized to augment the given map as described with respect to the map generation engine 130). Notably, the operational map engine 170 may interact with a software application that is accessible by the client device 110 (e.g., via the application engine 113) to provide the information about points of interest in the environment of the user and/or to provide the navigational directions to navigate the environment of the user.

In various implementations, the error detection engine 180 may be configured to detect an occurrence of one or more errors with respect to utilization of the operational mapping. In some versions of those implementations (e.g., and as described with respect to FIG. 3), the one or more errors with respect to utilization of the operational mapping may include no longer being able to provide information with respect to any points of interest in the environment, no longer being able to provide navigational directions to navigate through the environment, no longer being able to determine that the user is located in an environment corresponding to the given map (e.g., based on subsequent iterations of localizing the user in the environment). Put another way, the error detection engine 180 can utilize one or more of these signals to reactively determine to re-localize the user in the environment or a subsequent environment since it is reactively determined that the user has traveled to an area that no longer corresponds to the given map. In some versions of those implementations (e.g., and as described with respect to FIG. 3), the one or more errors with respect to utilization of the operational mapping may include determining that sensor data (e.g., obtained via the sensor engine 114) indicates the user is leaving or has left the environment that corresponds to the given map. Put another way, the error detection engine 180 can utilize one or more of these signals to proactively determine to re-localize the user in the environment or a subsequent environment since it is proactively determined that the user has traveled to an area that no longer corresponds to the given map.

Although FIG. 1 is described with respect to a single client device having a single user, it should be understood that is for the sake of example and is not meant to be limiting. For example, one or more additional client devices of a user or other users (e.g., client device(s) 190) can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199).

Figure 2:
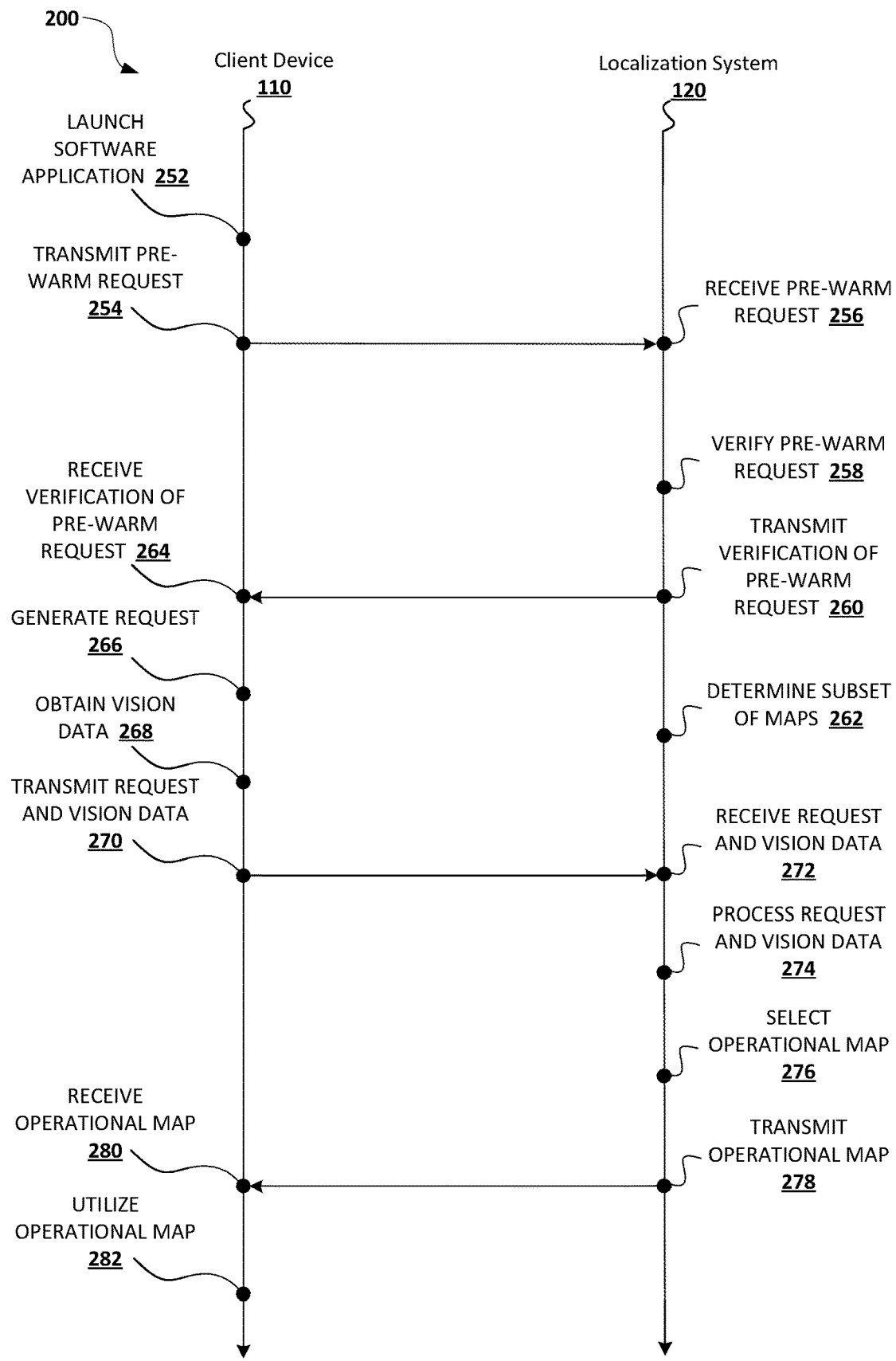
FIG. 2 depicts an example process flow of localization of a user in an environment, in accordance with various implementations.

Turning now to FIG. 2, an example process flow 200 of localization of a user in an environment is depicted. For the sake of example, assume that a user of the client device 110 launches a software application at the client device 110 as indicated at 252. In this example, the user launching the software application at the client device 110 can be utilized as a signal to localize the user of the client device 110 in an environment in which the user is located (although it should be understood that other signals to localize the user of the client device 110 are contemplated herein). In this example, the software application can facilitate the exchange of data between the client device 110 and the localization system 120. Accordingly, and in response to the software application being launched, the software application can generate and transmit a pre-warm request to the localization system 120 (e.g., over one or more busses of the client device 110, over one or more of the networks 199, etc.) as indicated at 254.

The localization system 120 can receive the pre-warm request as indicated at 256, verify the pre-warm request as indicated at 258, and transmit verification of the pre-warm request back to the software application as indicated at 260. As noted above with respect to the localization request engine 140 of FIG. 1, the pre-warm request may include building identifiers for any buildings that are locationally proximate to the client device 110, building identifiers for any buildings that are recognized based on processing vision data generated by vision component(s) of the client device 110, and/or building identifiers for any buildings that are specified by a user of the client device 110. This enables the localization system 120 to determine a subset of maps, from among a superset of maps stored in the map(s) database 120A, that are predicted to correspond to the environment of the user as indicated at 262.

Notably, while the localization system 120 verifies the pre-warm request, the software application may cause a loading screen to be displayed at the client device 110 to inform the user that the software application has initiated the localization process. Further, and in response to receiving verification of the pre-warm request as indicated at 264, the software application can generate a request for localization in an environment of the user as indicated at 266, obtain vision data to be processed in localizing the user in the environment as indicated at 268, and transmit the request and the vision data to the localization system 120 as a batch request as indicated at 270. In various implementations, other sensor data generated by other sensor(s) of the client device 110 that is obtained via the sensor engine 114 can also be included in the batch request. For instance, the batch request can additionally, or alternatively, include inertial measurement unit (IMU) data generated by IMU(s) of the client device 110, magnetometer data generated by magnetometer(s) of the client device 110, altimeter data generated by altimeter(s) of the client device 110, and/or other sensor data generated by other sensor(s) of the client device 110.

Moreover, the localization system 120 can receive the request and the vision data as indicated at 272 (and optionally the other sensor data), process the request and the vision data 274, and select, based on processing the request and the vision data (and optionally the other sensor data), an operational map as indicated at 276. Notably in processing the vision data and selecting the operational map, the localization system 120 can utilize one or more techniques described herein (e.g., as described with respect FIGS. 3-6). The localization can transmit the operational map to the software application as indicated at 278. Furthermore, the software application can receive the operational map as indicated at 280 and can utilize the operational map as indicated at 282.

Although FIG. 2 depicts particular operations being performed by the client device 110 and the localization system 120 from FIG. 1, it should be understood that the process flow 200 of FIG. 2 is provided to demonstrate some techniques contemplated herein and is not meant to be limiting.

Figure 3:
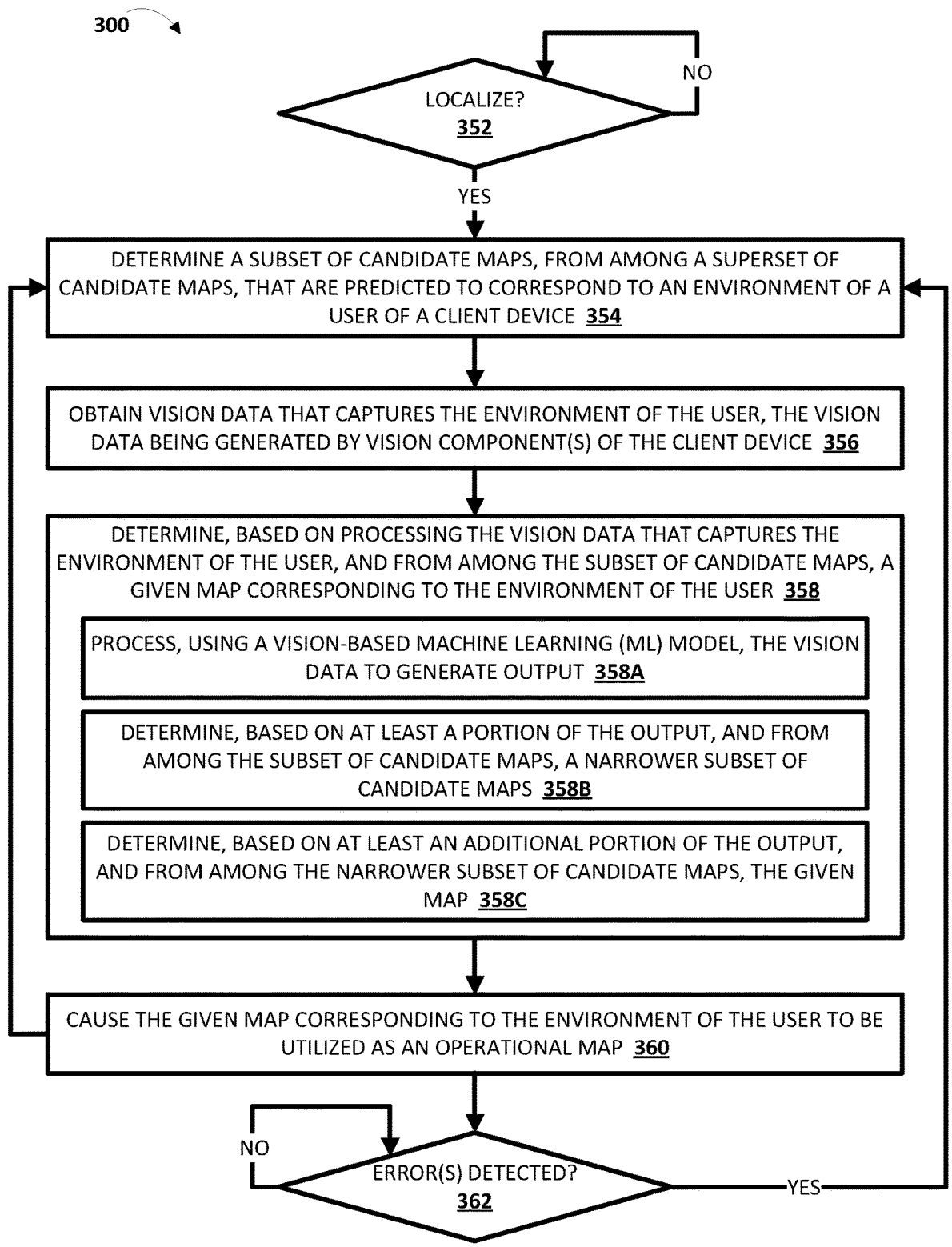
FIG. 3 depicts a flowchart illustrating an example method of utilizing a multi-scan technique for localization of a user in an environment, in accordance with various implementations.

Turning now to FIG. 3, a flowchart illustrating an example method 300 of utilizing a multi-scan technique for localization of a user in an environment is depicted. For convenience, the operations of the method 300 are described with reference to a system that performs the operations. This system of the method 300 includes one or more processors, memory, and/or other component(s) of computing device(s) (e.g., client device 110 of FIG. 1, localization system 120 of FIG. 1, client device 710 of FIGS. 7A and 7B, computing device 810 of FIG. 8, one or more servers, and/or other computing devices). Moreover, while operations of the method 300 are shown in a particular order, this is not meant to be limiting. One or more operations may be reordered, omitted, and/or added.

At block 352, the system determines whether to localize a user of a client device in an environment. If, at an iteration of block 352, the system determines not to localize the user of the client device in the environment, then the system continues monitoring for whether to localize the user of the client device in the environment. If, at an iteration of block 352, the system determines to localize the user of the client device in the environment, then the system proceeds to block 354. In some implementations, the system can determine to localize a user of a client device in an environment in response to a software application being launched at the client device. In these implementations, the system can obtain a pre-warm request (e.g., as described with respect to the localization request engine 140 of FIG. 1 and with respect to the process flow 200 of FIG. 2). In additional or alternative implementations, the system can determine to continuously localize a user in an environment (e.g., as a background process) to reduce latency in localizing the user in the environment when the software application is launched.

At block 354, the system determines a subset of candidate maps, from among a superset of candidate maps, that are predicted to correspond to the environment of the user of the client device. In some implementations, the system may determine the subset of candidate maps that are predicted to correspond to the environment of the user, and from among the superset of candidate maps, based on location data generated by location sensor(s) of the client device. For example, the superset of candidate maps may include all previously generated maps that are associated with a plurality of different buildings. However, the location data may indicate that the user has entered a particular building. In this example, the subset of candidate maps can include all of the maps that are associated with the particular building, surrounding buildings, and outdoor environment(s) around the particular building. In some versions of those implementations, the system may only obtain the location data generated by the location sensor(s) of the client device in response to a software application, that is accessible by the client device, being launched.

In additional or alternative implementations, the system may determine the subset of candidate maps that are predicted to correspond to the environment of the user, and from among the superset of candidate maps, based on user input received via a software application that is accessible by the client device. For example, the user can specify, by directing typed or spoken input to the software application, that they have entered a particular building. In this example, the subset of candidate maps can include all of the maps that are associated with the particular building, surrounding buildings, and outdoor environment(s) around the particular building.

In additional or alternative implementations, the system may determine the subset of candidate maps that are predicted to correspond to the environment of the user, and from among the superset of candidate maps, based on processing building classification vision data generated by the vision component(s) of the client device. For example, the processor(s) may process, using a building classifier, the building classification vision data to determine that a building in the environment of the user corresponds to a particular building. In this example, the subset of candidate maps can include all of the maps that are associated with the particular building, surrounding buildings, and outdoor environment(s) around the particular building. In some versions of those implementations, the system may only obtain the building classification vision data in response to a software application, that is accessible by the client device, being launched.

At block 356, the system obtains vision data that captures the environment of the user, the vision data being captured by vision component(s) of the client device. The vision component(s) can include RGB camera(s), 2D camera(s), 2.5D camera(s), 3D camera(s), LiDAR sensor(s), and/or any other suitable vision component(s) that are integral with the client device and/or external to, but in communication with, the client device. In various implementations, the system can obtain other sensor data generated by other sensor(s) of the client device. For instance, the system can additionally, or alternatively, obtain inertial measurement unit (IMU) data generated by IMU(s) of the client device, magnetometer data generated by magnetometer(s) of the client device, altimeter data generated by altimeter(s) of the client device, and/or other sensor data generated by other sensor(s) of the client device.

At block 358, the system determines, based on processing the vision data (and optionally the other sensor data) that captures the environment of the user, and from among the subset of candidate maps, a given map corresponding to the environment of the user. For example, in some implementations, and as indicated at sub-block 358A, the system may process, using a vision-based machine learning (ML) model, the vision data to generate output. Further, in some implementations, and as indicated at sub-block 358B, the system may determine, based on at least a portion of the output, and from among the subset of candidate maps, a narrower subset of candidate maps. Moreover, in some implementations, and as indicated at sub-block 358C, the system may determine, based on at least an additional portion of the output, and from among the narrower subset of candidate maps, the given map.

For example, assume that the ML model(s) include a feature extraction model that is trained to process the vision data to generate the output. In this example, the feature extraction model may be, for example, a CNN and/or other vision-based ML model(s). Further, the output may include, for example, global features of the environment that are extracted from the vision data, local features of the environment that are extracted from the vision data, and/or keypoint detection scores that are associated with the global features of the environment and/or that are associated with the local features of the environment. In this example, the portion of the output utilized by the processor(s) to determine the narrower subset of candidate maps, from among the subset of candidate maps, may include the global features of the environment that are extracted from the vision data and/or the keypoint detection scores that are associated with the global features of the environment. Further, the additional portion of the output utilized by the processor(s) to determine the given map, from among the narrower subset of candidate maps, may include the local features of the environment that are extracted from the vision data and/or the keypoint detection scores that are associated with the local features of the environment.

For instance, the system may initially utilize a rough feature matching algorithm or model (e.g., a k-nearest neighbors (kNN) algorithm, one or more distance functions to determine a distance between the global features and stored global features of previously generated map(s), or a hierarchical keypoint detection score matching technique) to process the global features of the environment that are extracted from the vision data and/or the keypoint detection scores that are associated with the global features of the environment. In this instance, and based on processing this portion of the output using the rough feature matching algorithm or model, one or more maps that have the same or similar embeddings, vectors, and/or other features to those included in the global features can be identified, and the keypoint detection scores associated with those global features can be utilized to determine whether to include one or more of those maps in the narrower subset of candidate maps. Further, the system may subsequently utilize a structure from motion (SfM) model (or another fine feature matching algorithm or model) to process the local features of the environment that are extracted from the vision data and/or the keypoint detection scores that are associated with the local features of the environment. In this instance, and based on processing this additional portion of the output using the fine feature matching algorithm or model, one or more maps that have the same or similar embeddings, vectors, and/or other features to those included in the local features can be identified, and the keypoint detection scores associated with those local features can be utilized to determine whether one or more of those maps in the narrower subset of candidate maps does, in fact, correspond to the environment of the user.

In some versions of those implementations, the system may only determine the given map corresponding to the environment of the user based on at least an additional portion of the output when the narrower subset of candidate maps includes multiple maps. Put another way, the system may forgo any additional processing when the narrower subset of maps only includes a single map. For instance, and assuming that the system determines that the narrower subset only includes a single map based on processing the global features of the environment, the system may refrain from processing the local features of the environment to conserve computational resources.

In some versions of those implementations, and assuming the narrower subset of candidate maps includes multiple maps, but that the system cannot disambiguate which of the multiple maps corresponds to the given map based on processing the local features, then the system may re-process the additional portion of the output using a higher threshold score to identify the given map. For instance, and assuming that the system determines that the narrower subset includes multiple maps based on processing the global features of the environment, but cannot determine which of the multiple maps corresponds to the given map of the environment in which the user is located, then the system may re-process the local features, but increase a threshold score with which the keypoint detection scores for the local features are compared. The system may repeat this process until the given map is determined. Although performing multiple passes across the fine feature matching algorithm or model may increase computational resources consumed in one of these instances, this enables the system to refrain from performing computationally intensive feature matching when not needed, and, in the aggregate, can conserve computational resources.

In various implementations, if the system is not able to determine the given map corresponding to the environment of the user at block 358 (e.g., the system determines that the narrower subset of candidate maps does not include any maps at sub-block 358B based on at least the portion of the output and/or the system cannot determine the given map at sub-block 358C based on at least the additional portion of the output), the system can perform an additional iteration of the operations of block 358. However, and prior to performing the additional iteration of the operations of block 358, the system can perform one or more image processing operations on the vision data. For instance, the system can rotate, translate, re-size, magnify, and/or perform other operations to modify the vision data. Accordingly, in performing the additional iteration of the operations of block 358, the system can determine, based on processing the modified vision data, and from among the subset of candidate maps, the given map. Notably, by rotating, translating, re-sizing, magnifying, and/or performing other operations to modify the vision data, additional features that are not present in the unmodified vision data can be detected in utilized in a subsequent iteration of sub-block 358A. These additional features can increase a likelihood that the system is able to determine the given map corresponding to the environment of the user.

At block 360, the system causes the given map corresponding to the environment of the user to be utilized as an operational map. The operational map can provide information related to points of interest in the environment of the user (e.g., as described with respect to FIG. 7A), provide navigational direction to navigate in the environment of the user (e.g., as described with respect to FIG. 7B). Notably, the operational map may be utilized by a software application that is accessible at the client device.

The system returns to block 354 to continue with a subsequent iteration of the method 300 to continue localizing the user in the environment until a signal is received to stop localizing the user in the environment (e.g., the software application is closed, the user provides an explicit instruction to stop, etc.). In continuing with the subsequent iteration of the method 300 to continue localizing the user in the environment, the system can consider the operational map utilized at block 360. This can further reduce consumption of computational resources in performing the subsequent iteration of the method since the system has a priori knowledge of where the user was previously localized. Further, the system also continues to block 362 to continue with the method 300.

At block 362, the system determines whether an occurrence of one or more errors has been detected. If, at an iteration of block 362, the system determines that no occurrence of any errors has been detected, then the system continues monitoring for the occurrence of one or more of the errors at block 362. If, at an iteration of block 362, the system determines that the occurrence of one or more of the errors has been detected, then the system returns to block 354 to continue with another iteration of the method 300. Put another way, the system may continue performing iterations of the method 300 by performing iterations of blocks 354-360. However, in response to detecting an occurrence of one or more errors, the system may immediately proceed to block 354, and optionally halt an iteration of the method 300 of FIG. 3 that was being performed when the one or more errors are detected.

In some implementations, the system can detect the occurrence of one or more of the errors based on, for instance, points of interest in the environment no longer being identified, navigational directions to navigate through the environment no longer being able to be provided, processing of the vision data resulting in inconsistent determinations of the given map, and/or other reactive determinations with respect to the operational map. In additional or alternative implementations, the system can detect the occurrence of one or more of the errors based on, for instance, sensor data generated by sensor(s) of the client device of the user. For example, if an altimeter of the client device indicates that the user is moving up or down, but IMU(s) of the client device indicate that there is no lateral motion (or lateral motion that is below a lateral motion threshold), then the system can infer that the user is on an elevator and proactively determine that the user will no longer be located on a same floor, which may cause error(s) to occur if the system continues to utilize the given map as the operational map. Accordingly, the system can initiate a subsequent iteration of the method 300. In this example, the system may pre-load all maps associated with floors that are accessible via the elevator. As another example, if an altimeter of the client device indicates that the user is moving up or down, but IMU(s) of the client device indicate that there is there is lateral motion (or lateral motion that is above a lateral motion threshold), then the system can infer that the user is on an escalator or stairs and proactively determine that the user will no longer be located on a same floor, which may cause error(s) to occur if the system continues to utilize the given map as the operational map. Accordingly, the system can initiate a subsequent iteration of the method 300. In this example, the system may pre-load all maps associated with floors that are accessible via the escalator or stairs.

Although block 362 is depicted at the end of the method 300 of FIG. 3, it should be understood that is for the sake of example and is not meant to be limiting. Rather, it should be understood that an iteration of block 362 may be continuously performed in parallel with other operations described with respect to the method 300 of FIG. 3. Moreover, although the method 300 of FIG. 3 is described with respect to using only the multi-scan technique in localizing the user in the environment, it should be understood that is for the sake of example and is not meant to be limiting. Rather, it should be appreciated that additional, or alternative, techniques are also contemplated herein.

Figure 4:
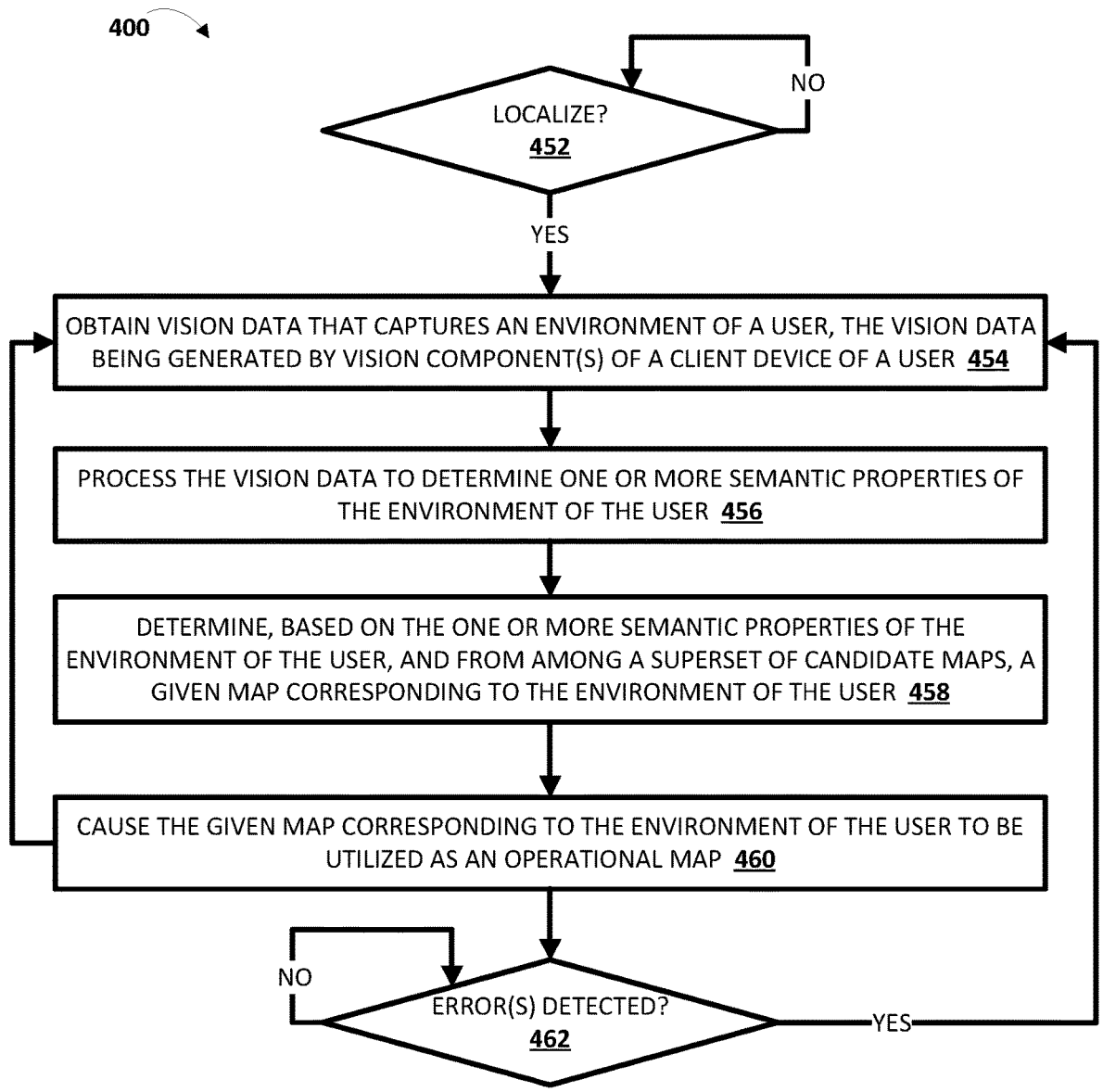
FIG. 4 depicts a flowchart illustrating an example method of utilizing a semantic segmentation technique for localization of a user in an environment, in accordance with various implementations.

Turning now to FIG. 4, a flowchart illustrating an example method 400 of utilizing a semantic segmentation technique for localization of a user in an environment is depicted. For convenience, the operations of the method 400 are described with reference to a system that performs the operations. This system of the method 400 includes one or more processors, memory, and/or other component(s) of computing device(s) (e.g., client device 110 of FIG. 1, localization system 120 of FIG. 1, client device 710 of FIGS. 7A and 7B, computing device 810 of FIG. 8, one or more servers, and/or other computing devices). Moreover, while operations of the method 400 are shown in a particular order, this is not meant to be limiting. One or more operations may be reordered, omitted, and/or added.

At block 452, the system determines whether to localize a user of a client device in an environment. If, at an iteration of block 452, the system determines not to localize the user of the client device in the environment, then the system continues monitoring for whether to localize the user of the client device in the environment. If, at an iteration of block 452, the system determines to localize the user of the client device in the environment, then the system proceeds to block 454. The system can determine whether to localize a user of a client device in an environment in the same or similar manner described with respect to block 352 of the method 300 of FIG. 3.

At block 454, the system obtains vision data that captures the environment of the user, the vision data being captured by vision component(s) of the client device. The system can obtain the vision data in the same or similar manner described with respect to block 356 of the method 300 of FIG. 3.

At block 456, the system processes the vision data to determine one or more semantic properties of the environment of the user. For example, the system can process the vision data using one or more ML model(s) to determine the one or more semantic properties of the environment. Notably, the one or more semantic properties of the environment of the user determined based on processing the vision data may be dependent on the ML model(s) that are utilized to process the vision data. The ML model(s) may include, for example, an edge detection ML model, an objection detection ML model, an object classification ML model, a door detection ML model, a lux detection ML model, a CLIP model, a VLM, and/or other ML model(s) that can be utilized to process the vision data and determine the one or more semantic properties.

At block 458, the system determines, based on the one or more semantic properties of the environment of the user, and from among a superset of candidate maps, a given map corresponding to the environment of the user. Notably, in the method 400 of FIG. 4, the system can determine the given map without having to process global features of the environment of the user, local features of the environment of the user, and/or keypoint detection scores for the global features of the environment of the user and/or for the local features of the environment of the user (e.g., as described with respect to block 358 of the method 300 of FIG. 4). However, if the system is not able to determine the given map based on the one or more semantic properties, then the system may revert back to processing the global features of the environment of the user, the local features of the environment of the user, and/or the keypoint detection scores for the global features of the environment of the user and/or for the local features of the environment of the user to determine the given map.

For example, assume that the system determines that multiple doors are detected in the environment of the user, that each of the doors have a corresponding width and a corresponding height or is a particular type of door (e.g., a sliding door, a revolving door, an arched door, etc.), and that the multiple doors are arranged in a particular configuration where a first door, of the multiple doors, faces east and a second door, of the multiple doors, faces south. In this example, the given map may be stored in association with one or more stored semantic properties that indicate the given map includes a particular unique configuration of doors and their locations, and that this particular unique configuration is a sufficient signal to determine that the environment of the user corresponds to the given map. Accordingly, the system may determine that the given map corresponds to the environment of the user, and from among the superset of candidate maps, based on the multiple doors alone. Although the above example is described with respect to the semantic properties including the multiple doors having certain properties, it should be understood that is for the sake of example and is not meant to be limiting. For instance, the semantic properties may further include color(s) and/or pattern(s) of each of the multiple doors, and/or other semantic properties described herein that are not related to the doors. Further, it should be understood that the semantic properties in the environment can be virtually limitless and vary from environment to environment.

As another example, assume that the system determines a lux of one or more lights in the environment of the user or a light frequency emitted by one or more of the lights in the environment of the user. In this example, the given map may be stored in association with one or more stored semantic properties that indicate the given map includes the one or more lights having a particular lux and/or particular light frequency, and that the particular lux and/or the particular light frequency is a sufficient signal to determine that the environment of the user corresponds to the given map. Accordingly, and similar to the above example, the system may determine that the given map corresponds to the environment of the user, and from among the superset of candidate maps, based on the particular lux and/or the particular light frequency alone. Although the above example is described with respect to the semantic properties including the one or more lights having certain properties, it should be understood that is for the sake of example and is not meant to be limiting. For instance, the semantic properties may further include color(s) emitted by and/or shape(s) of each of the one or more lights, and/or other semantic properties described herein that are not related to the one or more lights. Further, it should be understood that the semantic properties in the environment can be virtually limitless and vary from environment to environment.

At block 460, the system causes the given map corresponding to the environment of the user to be utilized as an operational map. The system can cause the given map to be utilized as the operational map in the same or similar manner described with respect to block 360 of the method 300 of FIG. 3.

The system returns to block 454 to continue with another iteration of the method 400 to continue localizing the user in the environment until a signal is received to stop localizing the user in the environment (e.g., the software application is closed, the user provides an explicit instruction to stop, etc.). Further, the system also continues to block 462 to continue with the method 400.

At block 462, the system determines whether an occurrence of one or more errors has been detected. If, at an iteration of block 462, the system determines that no occurrence of any errors has been detected, then the system continues monitoring for the occurrence of one or more of the errors at block 462. If, at an iteration of block 462, the system determines that the occurrence of one or more of the errors has been detected, then the system returns to block 454 to continue with another iteration of the method 400. The system can determine whether an occurrence of one or more errors has been detected in the same or similar manner described with respect to block 362 of the method 300 of FIG. 3.

Although the method 400 of FIG. 4 is described with respect to using only the semantic segmentation technique in localizing the user in the environment, it should be understood that is for the sake of example and is not meant to be limiting. Rather, it should be appreciated that additional, or alternative, techniques are also contemplated herein.

Figure 5:
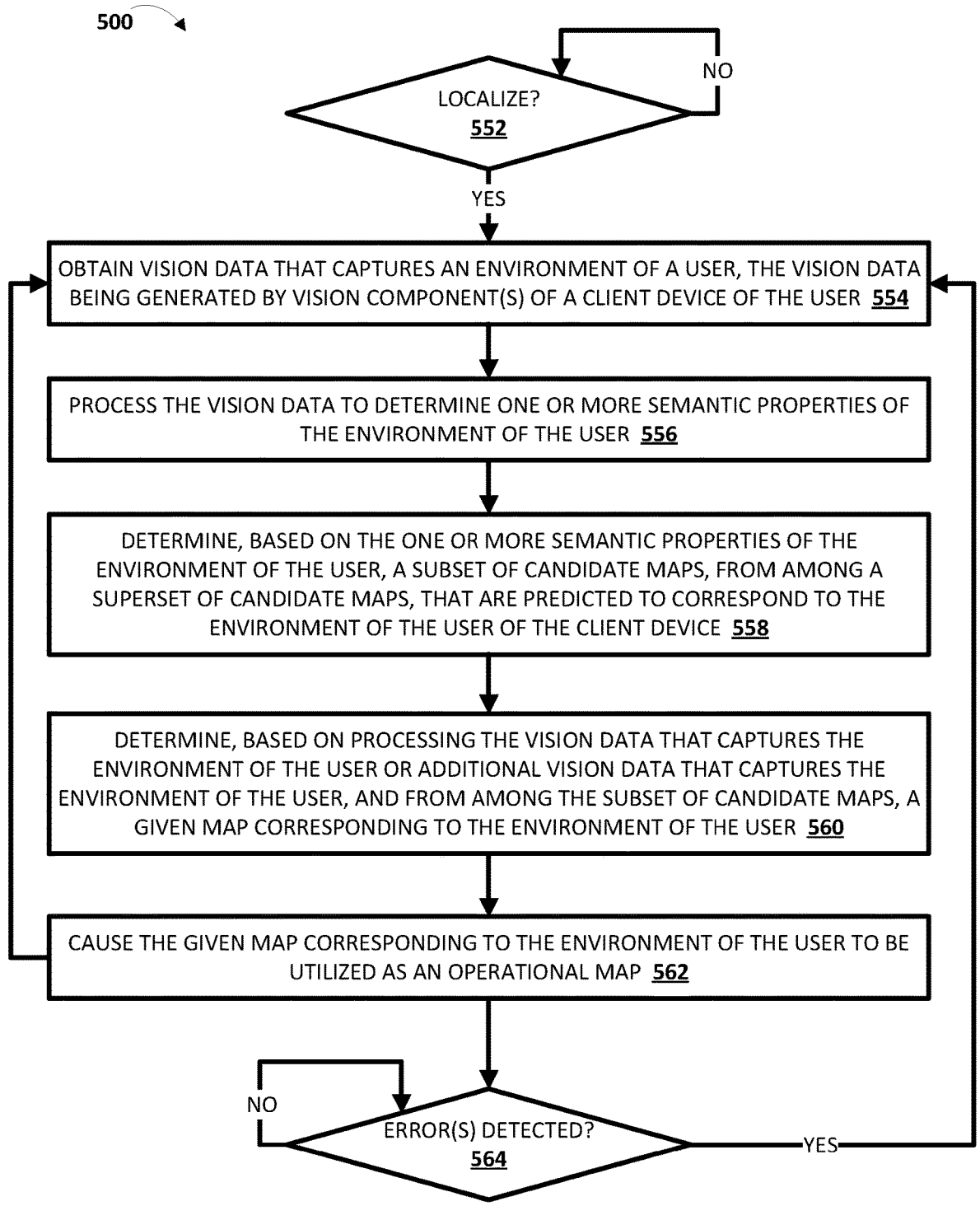
FIG. 5 depicts a flowchart illustrating an example method of utilizing a multi-scan technique in combination with a semantic segmentation technique for localization of a user in an environment, in accordance with various implementations.

Turning now to FIG. 5, a flowchart illustrating an example method 500 of utilizing a multi-scan technique in combination with a semantic segmentation technique for localization of a user in an environment is depicted. For convenience, the operations of the method 500 are described with reference to a system that performs the operations. This system of the method 500 includes one or more processors, memory, and/or other component(s) of computing device(s) (e.g., client device 110 of FIG. 1, localization system 120 of FIG. 1, client device 710 of FIGS. 7A and 7B, computing device 810 of FIG. 8, one or more servers, and/or other computing devices). Moreover, while operations of the method 500 are shown in a particular order, this is not meant to be limiting. One or more operations may be reordered, omitted, and/or added.

At block 552, the system determines whether to localize a user of a client device in an environment. If, at an iteration of block 552, the system determines not to localize the user of the client device in the environment, then the system continues monitoring for whether to localize the user of the client device in the environment. If, at an iteration of block 552, the system determines to localize the user of the client device in the environment, then the system proceeds to block 554. The system can determine whether to localize a user of a client device in an environment in the same or similar manner described with respect to block 352 of the method 300 of FIG. 3.

At block 554, the system obtains vision data that captures the environment of the user, the vision data being captured by vision component(s) of the client device. The system can obtain the vision data in the same or similar manner described with respect to block 356 of the method 300 of FIG. 3.

At block 556, the system processes the vision data to determine one or more semantic properties of the environment of the user. The system can process the vision data to determine the one or more semantic properties in the same or similar manner described with respect to block 456 of the method 400 of FIG. 4.

At block 558, the system determines, based on the one or more semantic properties of the environment of the user, a subset of candidate maps, from among a superset of candidate maps, that are predicted to correspond to the environment of the user of the client device. For example, assume that the semantic properties indicate that there are two doors in the environment. In this example, the system can identify all of the maps that include two doors in the environment (e.g., based on the doors being augmented when the maps were generated), and select those maps for inclusion in the subset of candidate maps. As another example, assume that the semantic properties indicate that there is a large conference table in a room in the environment. In this example, the system can identify all of the maps that large conference tables in the environment (e.g., based on the large conference tables being augmented when the maps were generated), and select those maps for inclusion in the subset of candidate maps. Notably, in various implementations, the one or more semantic properties of the environment of the user can be utilized by the system to determine the subset of candidate maps in combination with other techniques (e.g., based on location data, user input, building identification, etc.). However, the one or more semantic properties of the environment of the user can be utilized by the system to determine the subset of candidate maps alone in various implementations (e.g., when the location data is not available, when no user input is received, when building identification fails or is not performed, etc.).

At block 560, the system determines, based on processing the vision data that captures the environment of the user or additional vision data that captures the environment of the user, a given map corresponding to the environment of the user. The system can determine the given map corresponds to the environment of the user and based on processing the vision data or the additional vision data in the same or similar manner described with respect to block 358 of the method 300 of FIG. 3.

At block 562, the system causes the given map corresponding to the environment of the user to be utilized as an operational map. The system can cause the given map to be utilized as the operational map in the same or similar manner described with respect to block 360 of the method 300 of FIG. 3.

The system returns to block 554 to continue with another iteration of the method 500 to continue localizing the user in the environment until a signal is received to stop localizing the user in the environment (e.g., the software application is closed, the user provides an explicit instruction to stop, etc.). Further, the system also continues to block 564 to continue with the method 500.

At block 564, the system determines whether an occurrence of one or more errors has been detected. If, at an iteration of block 564, the system determines that no occurrence of any errors has been detected, then the system continues monitoring for the occurrence of one or more of the errors at block 564. If, at an iteration of block 564, the system determines that the occurrence of one or more of the errors has been detected, then the system returns to block 554 to continue with another iteration of the method 500. The system can determine whether an occurrence of one or more errors has been detected in the same or similar manner described with respect to block 362 of the method 300 of FIG. 3.

Although the method 500 of FIG. 5 is described with respect to using the multi-scan technique and the semantic segmentation technique in a particular manner in localizing the user in the environment, it should be understood that is for the sake of example and is not meant to be limiting. Rather, it should be appreciated that additional, or alternative, techniques for combining both the multi-scan technique and the semantic segmentation technique are also contemplated herein.

Figure 6:
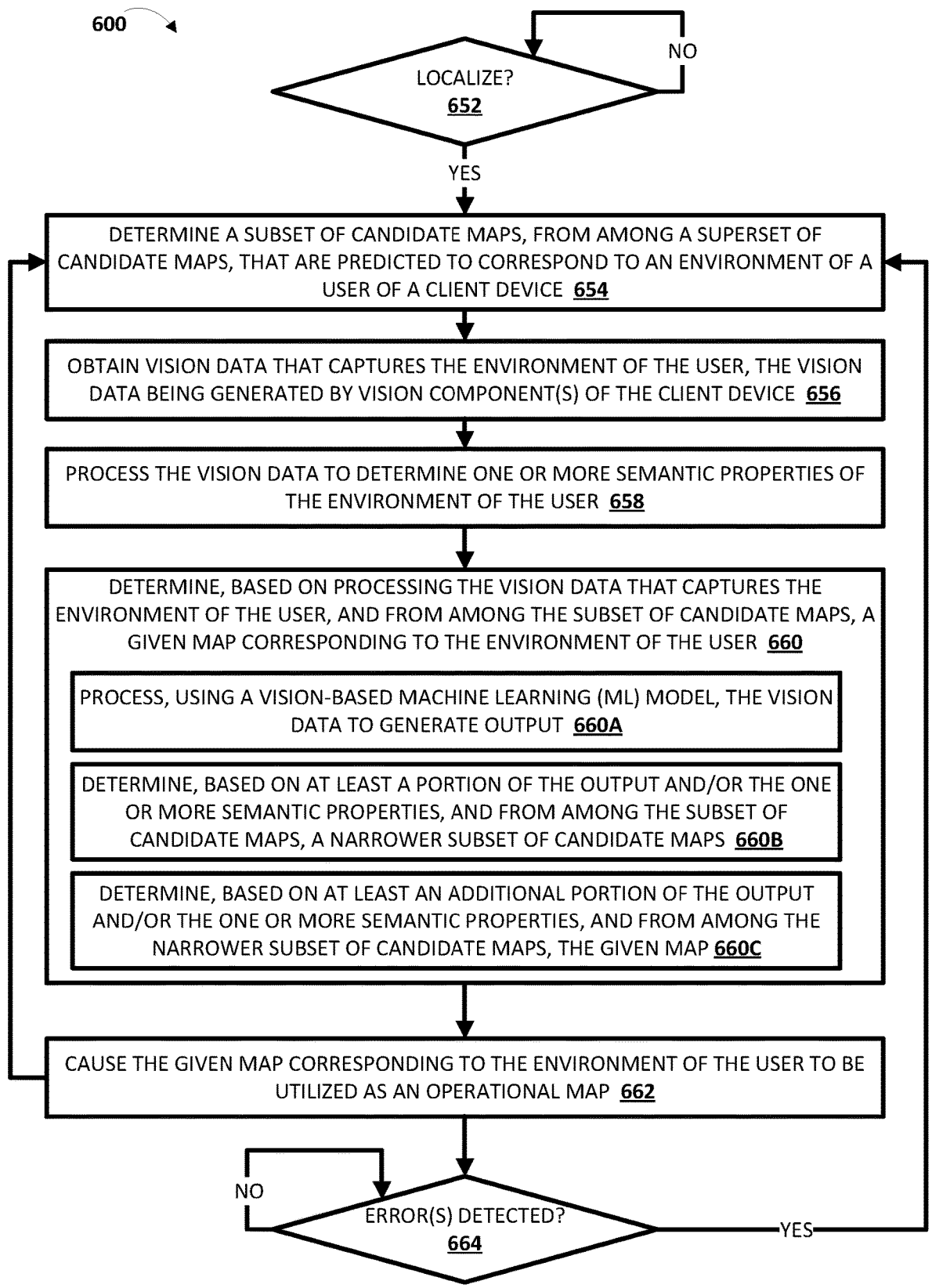
FIG. 6 depicts a flowchart illustrating another example method of utilizing a multi-scan technique in combination with a semantic segmentation technique for localization of a user in an environment, in accordance with various implementations.

Turning now to FIG. 6, a flowchart illustrating another example method 600 of utilizing a multi-scan technique in combination with a semantic segmentation technique for localization of a user in an environment is depicted. For convenience, the operations of the method 600 are described with reference to a system that performs the operations. This system of the method 600 includes one or more processors, memory, and/or other component(s) of computing device(s) (e.g., client device 110 of FIG. 1, localization system 120 of FIG. 1, client device 710 of FIGS. 7A and 7B, computing device 810 of FIG. 8, one or more servers, and/or other computing devices). Moreover, while operations of the method 600 are shown in a particular order, this is not meant to be limiting. One or more operations may be reordered, omitted, and/or added.

At block 652, the system determines whether to localize a user of a client device in an environment. If, at an iteration of block 652, the system determines not to localize the user of the client device in the environment, then the system continues monitoring for whether to localize the user of the client device in the environment. If, at an iteration of block 652, the system determines to localize the user of the client device in the environment, then the system proceeds to block 654. The system can determine whether to localize a user of a client device in an environment in the same or similar manner described with respect to block 352 of the method 300 of FIG. 3.

At block 654, the system determines a subset of candidate maps, from among a superset of candidate maps, that are predicted to correspond to the environment of the user of the client device. In some implementations, the system can determine the subset of maps in the same or similar manner described with respect to block 354 of the method 300 of FIG. 3. In additional or alternative implementations, the system can determine the subset of maps in the same or similar manner described with respect to blocks 556 and 558 of the method 500 of FIG. 5.

At block 656, the system obtains vision data that captures the environment of the user, the vision data being captured by vision component(s) of the client device. The system can obtain the vision data in the same or similar manner described with respect to block 356 of the method 300 of FIG. 3.

At block 658, the system processes the vision data to determine one or more semantic properties of the environment of the user. The system can process the vision data to determine the one or more semantic properties in the same or similar manner described with respect to block 456 of the method 400 of FIG. 4.

At block 660, the system determines, based on processing the vision data that captures the environment of the user, and from among the subset of candidate maps, a given map corresponding to the environment of the user. For example, in some implementations, and as indicated at sub-block 660A, the system may process, using a vision-based machine learning (ML) model, the vision data to generate output. Further, in some implementations, and as indicated at sub-block 6601B, the system may determine, based on at least a portion of the output and/or the one or more semantic properties, and from among the subset of candidate maps, a narrower subset of candidate maps. Moreover, in some implementations, and as indicated at sub-block 660C, the system may determine, based on at least an additional portion of the output and/or the one or more semantic properties, and from among the narrower subset of candidate maps, the given map. The system can process the vision data to generate the output in block 660A in the same or similar manner described with respect to block 358A of the method 300 of FIG. 3.

However, in contrast with block 358B and 358C the method 300 of FIG. 3, and in determining the narrower subset of candidate maps at block 6601B and/or in determining the given map at block 660C, the system can additionally, or alternatively, consider the one or more semantic properties. For example, assume that the narrower subset of candidate maps includes two maps, and that one of the maps includes two benches, but the other map includes no benches. In this example, if the one or more semantic properties indicate the two benches are in the environment, then the system can determine that the map that includes the two benches corresponds to the environment without having to process the local features of the environment of the user, thereby conserving computational resources by forgoing the processing of the local features. Accordingly, not only can the one or more semantic properties of the environment of the user be utilized to initially constrain the search space (e.g., as describe with respect to the method 500 of FIG. 5), but the one or more semantic properties of the environment of the user can additionally, or alternatively, also be utilized in determining the narrower subset of candidate maps and/or in determining the given map.

At block 662, the system causes the given map corresponding to the environment of the user to be utilized as an operational map. The system can cause the given map to be utilized as the operational map in the same or similar manner described with respect to block 360 of the method 300 of FIG. 3.

The system returns to block 654 to continue with another iteration of the method 600 to continue localizing the user in the environment until a signal is received to stop localizing the user in the environment (e.g., the software application is closed, the user provides an explicit instruction to stop, etc.). Further, the system also continues to block 664 to continue with the method 600.

At block 664, the system determines whether an occurrence of one or more errors has been detected. If, at an iteration of block 664, the system determines that no occurrence of any errors has been detected, then the system continues monitoring for the occurrence of one or more of the errors at block 664. If, at an iteration of block 664, the system determines that the occurrence of one or more of the errors has been detected, then the system returns to block 654 to continue with another iteration of the method 600.

Although the method 600 of FIG. 6 is described with respect to using the multi-scan technique and the semantic segmentation technique in a particular manner in localizing the user in the environment, it should be understood that is for the sake of example and is not meant to be limiting. Rather, it should be appreciated that additional, or alternative, techniques for combining both the multi-scan technique and the semantic segmentation technique are also contemplated herein.

Figure 7A:
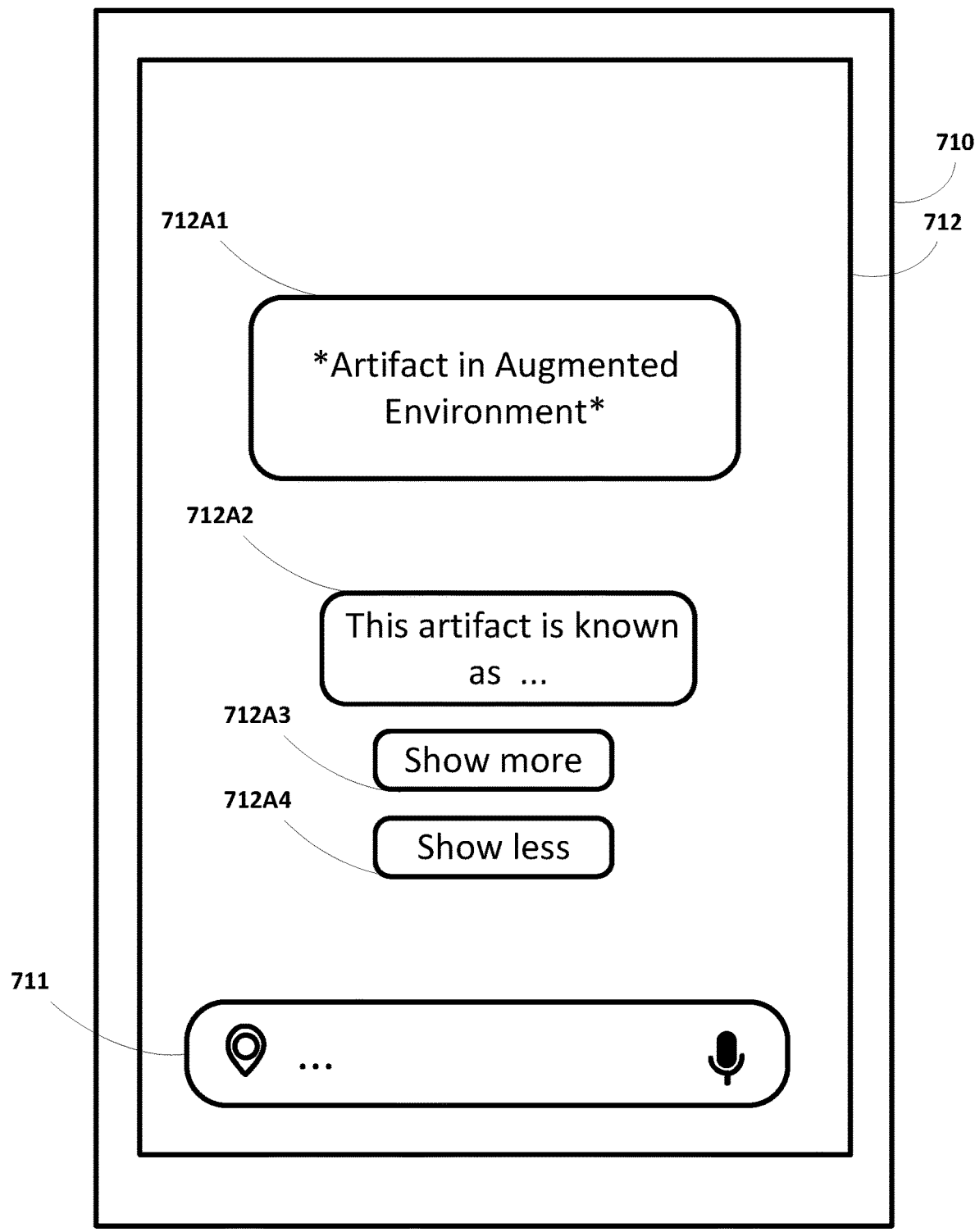
FIGS. 7A and 7B depict various non-limiting examples of utilizing an operational map determined based on localization of a user in an environment, in accordance with various implementations.
Figure 7B:
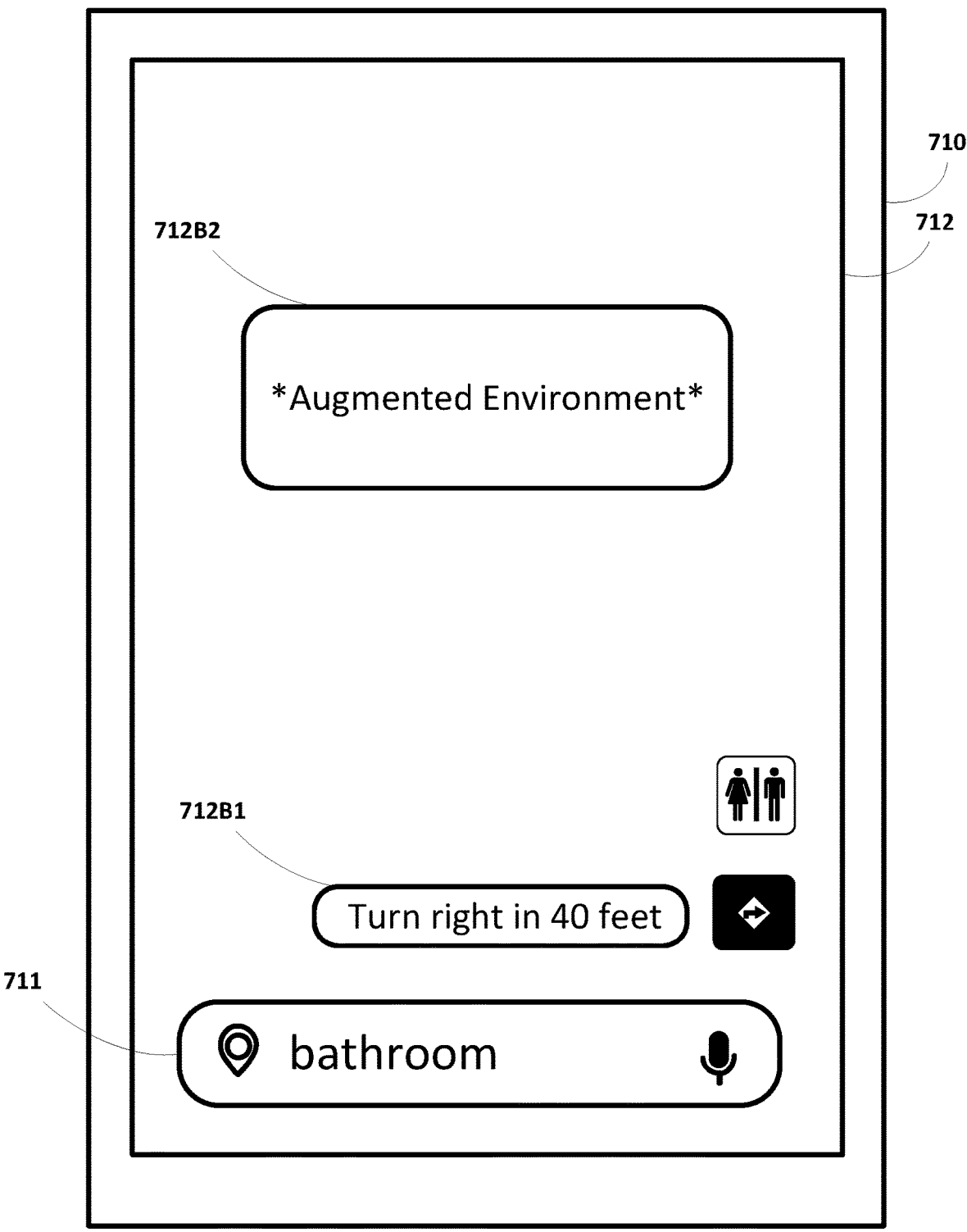

Turning now to FIGS. 7A and 7B, various non-limiting examples of utilizing an operational map determined based on localization of a user in an environment are depicted. For the sake of example, assume that a user of a client device 710 (e.g., an instance of the client device 110 from FIG. 1) has entered a museum, and that the user of the client device 710 is interacting with a software application that leverages the capabilities of a localization system described herein (e.g., the localization system 120). Further assume that the localization system has determined a given map to be utilized as an operational map for the museum, or a portion of the museum, in which the user is located. The client device 710 may include, for example, a user input field 711 which the user of the client device 710 may direct typed input via a virtual keyboard (not depicted) and/or spoken input (and optionally subsequent to actuation of a microphone interface element or speaking a particular word or phrase to enable speech recognition). Further, the client device 710 may include, for example, a touch-sensitive display 712 that the user can interact with and view visual content that is rendered on the display 712. Moreover, the client device 710 may include, for example, one or more speakers via which audible content can be rendered for presentation to the user. Although the client device 710 is depicted as a mobile phone having certain capabilities, it should be understood that is for the sake of example and is not meant to be limiting.

Referring specifically to FIG. 7A, assume that the user is viewing an artifact in an augmented environment as indicated at 712A1. The artifact in the augmented environment may be considered a point of interest, and, in previously generating the given map, information about the artifact may be provided. For instance, the information can identify a name of the artifact as indicated at 712A2, origin information associated with the artifact, provenance associated with the artifact, and/or other information associated with the artifact. Notably, the information can be visually rendered for presentation to the user via the display 712 and/or can be audibly rendered for presentation to the user via one or more speakers of the client device 710.

In various implementations, the user may be provided with various options to control a level of detail of the information provided as the user views the artifact via the display 712. For example, a "show more" selectable element 712A3 may be provided that, when selected, causes more detailed information about the artifact to be provided. As another example, a "show less" selectable element 712A4 may be provided that, when selected, causes less detailed information about the artifact to be provided. Notably, as the user moves a field of view of vision component(s) around the environment, the display 712 may be dynamically updated with information about other points of interest included in the environment that enter the field of view of the vision component(s).

Referring specifically to FIG. 7B, assume that the user directed user input of "bathroom" to the user input field 711. In this example, navigational directions can be provided to a bathroom in the environment as indicated by 712B1. The navigational directions can be, for example, turn-by-turn directions to enable the user to efficiently navigate to a desired location (e.g., a bathroom in the example of FIG. 7B). Notably, as the user moves a field of view of vision component(s) around the environment while navigating to the bathroom, the display 712 may be dynamically updated with information about other points of interest included in the environment that enter the field of view of the vision component(s) as indicated by 712B2. Accordingly, as the user navigates to the bathroom, obstacles in the environment can be identified and augmented to ensure that the user can avoid them while navigating.

Although FIGS. 7A and 7B depict particular examples of how an operational map can be utilized, it should be understood that these examples are not meant to be limiting. Rather, it should be understood that the operational map can be utilized for additional, or alternative, purposes. For example, the operational maps can be utilized by first responders to navigate unfamiliar buildings, by various users to consume interactive virtual tours, by building operators to track assets within a building to mitigate lost assets, and/or for other purposes.

Figure 8:
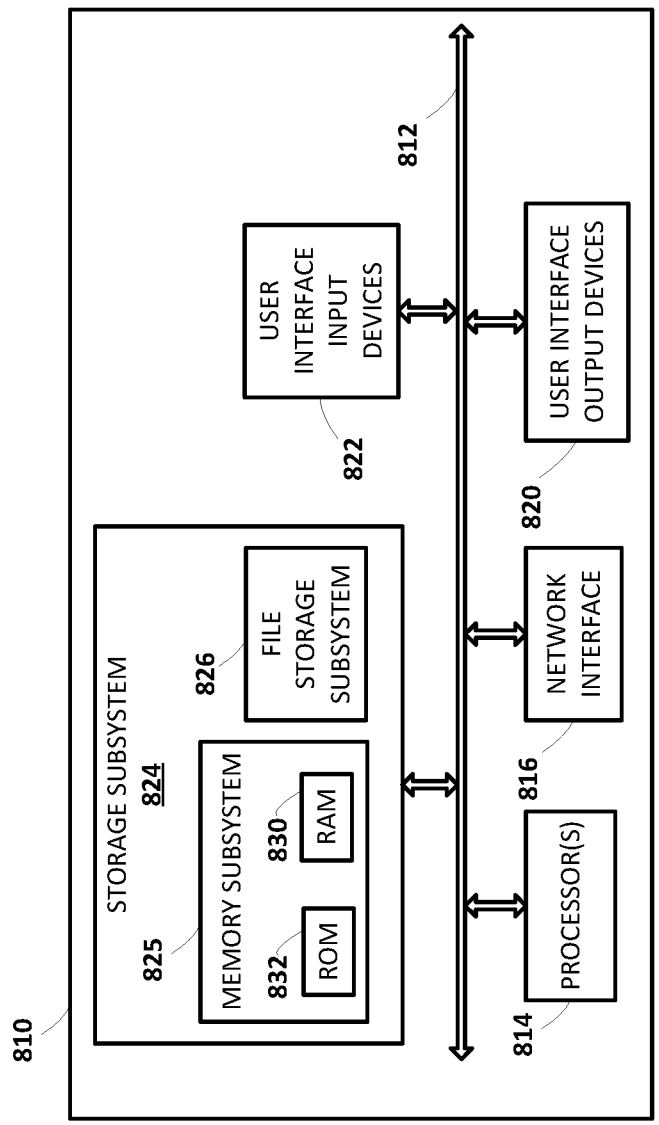
FIG. 8 depicts an example architecture of a computing device, in accordance with various implementations.

Turning now to FIG. 8, a block diagram of an example computing device 810 that may optionally be utilized to perform one or more aspects of techniques described herein is depicted. In some implementations, one or more of a client device, localization system, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the methods disclosed herein, as well as to implement various components depicted in FIGS. 1 and 2.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD- ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem 812 may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes determining a subset of candidate maps, from among a superset of candidate maps, that are predicted to correspond to an environment of a user of a client device; obtaining vision data that captures the environment of the user, the vision data being generated by one or more vision components of the client device of the user; and determining, based on processing the vision data that captures the environment of the user, and from among the subset of candidate maps, a given map corresponding to the environment of the user. Determining the given map corresponding to the environment of the user based on processing the vision data that captures the environment of the user, and from among the subset of candidate maps, includes: processing, using a machine learning (ML) model, the vision data to generate output; determining, based on at least a portion of the output, and from among the subset of candidate maps, a narrower subset of candidate maps; and determining, based on at least an additional portion of the output, and from among the narrower subset of candidate maps, the given map. The method further includes causing the given map corresponding to the environment of the user to be utilized as an operational map.

These and other implementations of technology disclosed herein can optionally include one or more of the following features.

In some implementations, determining the given map based on the additional portion of the output, and from among the narrower subset of candidate maps, may be in response to determining that the narrower subset of candidate maps includes multiple candidate maps.

In some versions of those implementations, the method may further include, in response to determining that the narrower subset of candidate maps includes a single candidate map: refraining from determining, based on the additional portion of the output, and from among the narrower subset of candidate maps, the given map; and determining the single candidate map is the given map corresponding to the environment of the user.

In some implementations, the ML model may be a feature extraction model, and the output generated based on processing the vision data using the ML model may include: global features of the environment of the user, local features of the environment of the user, and keypoint detection scores associated with the global features of the environment of the user and/or the local features of the environment of the user.

In some versions of those implementations, determining the narrower subset of candidate maps based on at least the portion of the output, and from among the subset of candidate maps, may include: processing, using a rough feature matching algorithm or model, the global features of the environment of the user and/or the keypoint detection scores associated with the global features of the environment of the user to determine, from among the subset of candidate maps, the narrower subset of candidate maps.

In additional or alternative versions of those implementations, determining the given map based on at least the additional portion of the output, and from among the narrower subset of candidate maps, may include: processing, using a fine feature matching algorithm or model, the local features of the environment of the user and/or the keypoint detection scores associated with the local features of the environment of the user to determine, from among the narrower subset of candidate maps, the given map.

In some implementations, determining the subset of candidate maps that are predicted to correspond to the environment of the user of the client device, and from among the superset of candidate maps, may include: obtaining location data associated with the client device of the user, the location data being generated by one or more location sensors of the client device of the user; and determining, based on the location data associated with the client device of the user, the subset of candidate maps that are predicted to correspond to the environment of the user of the client device, and from among the superset of candidate maps.

In some implementations, determining the subset of candidate maps that are predicted to correspond to the environment of the user of the client device, and from among the superset of candidate maps, may include: obtaining, via a software application that is accessible by the client device of the user, user input the user input being generated by one or more user input interfaces of the client device of the user; and determining, based on the user input obtained via the software application, the subset of candidate maps that are predicted to correspond to the environment of the user of the client device, and from among the superset of candidate maps.

In some implementations, causing the given map corresponding to the environment of the user to be utilized as the operational map may include: causing the operational map to be utilized by a software application, that is accessible by the client device of the user, to provide the user with navigational directions from a current location of the user in the environment and to a given point of interest in the environment that is specified by the user via the software application.

In some implementations, causing the given map corresponding to the environment of the user to be utilized as the operational map may include: causing the operational map to be utilized by a software application, that is accessible by the client device of the user, to provide the user with information related to a plurality of points of interest in the environment.

In some implementations, the method may further include, prior to determining the subset of candidate maps that are predicted to correspond to the environment of the user of the client device, and from among the superset of candidate maps: generating each map that is included in the superset of candidate maps, the superset of candidate maps including the given map corresponding to the environment of the user and a plurality of additional maps of other environments.

In some versions of those implementations, generating the given map may include: obtaining mapping vision data that captures the environment of the user, the mapping vision data being generated by one or more additional vision components, and the one or more additional vision components being associated with: an additional user that is manually traversing through the environment of the user, or a robot that is autonomously or semi-autonomously traversing through the environment of the user; generating, based on the mapping vision data, the given map corresponding to the environment of the user; and augmenting the given map corresponding to the environment of the user with information related to points of interest included in the environment of the user.

In some further versions of those implementations, augmenting the given map corresponding to the environment of the user with information related to the points of interest included in the environment of the user may include obtaining user input that: labels the points of interest in the environment of the user; provides various levels of information about the points of interest in the environment of the user; assigns semantic properties to the points of interest in the environment; magnifies one or more obstacles in the environment of the user; or draws shapes around one or more of the obstacles in the environment of the user.

In some implementations, the environment of the user may correspond to an indoor environment of a building, and each of the subset of candidate maps may be associated with: the building, a corresponding floor of the building, a portion of the corresponding floor of the building, or an outdoor environment that surrounds the building.

In some versions of those implementations, the method may further include, prior to obtaining the vision data that captures the environment of the user: obtaining, via a software application that is accessible by the client device, a pre-warm request that includes a building identifier for the building.

In some further versions of those implementations, the method may further include, subsequent to obtaining the vision data that captures the environment of the user: obtaining, via the software application that is accessible by the client device, a batch request that includes the building identifier for the building and the vision data.

In some implementations, the method may further include: obtaining additional vision data that captures a subsequent environment of the user, the vision data being generated by one or more of the vision components of the client device of the user; determining, based on processing the additional vision data that captures the subsequent environment of the user, and from among the subset of candidate maps, whether to continue utilizing the given map as the operational map for the subsequent environment of the user or to utilize an additional given map as the operational map for the subsequent environment of the user; and causing, based on the determination, the given map or the additional given map to be utilized as the operational map for the subsequent environment of the user.

In some versions of those implementations, obtaining the additional vision data that captures the subsequent environment of the user may be in response to detecting an occurrence of an error with respect to the causing the given map to be utilized as the operational map for the environment of the user, and the occurrence of the error with respect to the causing the given map to be utilized as the operational map for the environment of the user may include one or more of: points of interest in the environment no longer being identified via a software application that is accessible by the client device, navigational directions through the environment no longer being able to be provided via the software application that is accessible by the client device, and/or intervening vision data, that is captured by one or more of the vision components of the client device subsequent to the vision data being captured and prior to the additional vision data being captured, being processed and indicating that the user is no longer located in the environment corresponding to the given map.

In some further versions of those implementations, obtaining the additional vision data that captures the subsequent environment of the user may be in response to detecting an occurrence of sensor data, that is generated by one or more sensors of the client device, indicating that the user is no longer located in the environment corresponding to the given map, and the one or more sensors of the client device may include one or more of: one or more location sensors of the client device, one or more gyroscopes of the client device, one or more accelerometers of the client device, one or more motion sensors of the client device, one or more inertial measurement units of the client device, or one or more altimeters of the client device.

In some implementations, a method implemented by one or more processors is provided, and includes obtaining vision data that captures an environment of a user of a client device, the vision data being generated by one or more vision components of the client device of the user; processing, using one or more machine learning (ML) models, the vision data to determine one or more semantic properties of the environment of the user; determining, based on one or more of the semantic properties of the environment of the user, a subset of candidate maps, from a superset of candidate maps, that are predicted to correspond to the environment of the user; determining, based on processing the vision data that captures the environment of the user or based on processing additional vision data that captures the environment of the user, and from among the subset of candidate maps, a given map corresponding to the environment of the user; and causing the given map corresponding to the environment of the user to be utilized as an operational map.

These and other implementations of technology disclosed herein can optionally include one or more of the following features.

In some implementations, the one or more ML models may include one or more of: an edge detection ML model, an objection detection ML model, an object classification ML model, a door detection ML model, a lux detection ML model, a contrastive language-image pre-training (CLIP) model, or a visual language model (VLM).

In some versions of those implementations, the one or more semantic properties may be dependent on the one or more ML models that are utilized to process the vision data.

In some further versions of those implementations, the one or more semantic properties may include one or more of: edges detected in the environment of the user; objects detected in the environment of the user; sizes and/or orientations of the objects detected in the environment of the user; classifications of the objects detected in the environment of the user; one or more doors detected in the environment of the user; sizes and/or orientations of the one or more doors detected in the environment of the user; a quantity of the one or more doors detected in the environment of the user; or a lux of one or more lights in the environment of the user.

In some implementations, the one or more semantic properties may be assigned to corresponding points of interest included in each map, included in the superset of candidate maps, when each of the maps are generated.

In some versions of those implementations, each of the maps, included in the superset of candidate maps, may be generated prior to obtaining the vision data that captures the environment of the user.

In some implementations, determining the given map corresponding to the environment of the user based on processing the vision data that captures the environment of the user or based on processing additional vision data that captures the environment of the user, and from among the subset of candidate maps, may include: processing, using a machine learning (ML) model, the vision data to generate output; determining, based on at least a portion of the output, and from among the subset of candidate maps, a narrower subset of candidate maps; and determining, based on at least an additional portion of the output, and from among the narrower subset of candidate maps, the given map.

In some implementations, a method implemented by one or more processors is provided, and includes determining a subset of candidate maps, from among a superset of candidate maps, that are predicted to correspond to an environment of a user of a client device; obtaining vision data that captures the environment of the user, the vision data being generated by one or more vision components of the client device of the user; processing, using one or more machine learning (ML) models, the vision data to determine one or more semantic properties of the environment of the user; determining, based on processing the vision data that captures the environment of the user or based on processing additional vision data that captures the environment of the user, and from among the subset of candidate maps, a given map corresponding to the environment of the user. Determining the given map corresponding to the environment of the user based on processing the vision data that captures the environment of the user, and from among the subset of candidate maps, may include: processing, using a machine learning (ML) model, the vision data to generate output; determining, based on at least a portion of the output, and from among the subset of candidate maps, a narrower subset of candidate maps; and determining, based on at least the one or more semantic properties, and from among the narrower subset of candidate maps, the given map. The method may further include causing the given map corresponding to the environment of the user to be utilized as an operational map.

These and other implementations of technology disclosed herein can optionally include one or more of the following features.

In some implementations, the ML model may be a feature extraction model, the output generated based on processing the vision data using the ML model may include: global features of the environment of the user, local features of the environment of the user, and keypoint detection scores associated with the global features of the environment of the user and/or the local features of the environment of the user. Further, determining the narrower subset of candidate maps based on at least the portion of the output, and from among the subset of candidate maps, may include processing, using a rough feature matching algorithm or model, the global features of the environment of the user and/or the keypoint detection scores associated with the global features of the environment of the user to determine, from among the subset of candidate maps, the narrower subset of candidate maps. Moreover, determining the given map based on at least the additional portion of the output, and from among the narrower subset of candidate maps, may include comparing the one or more semantic properties to one or more stored semantic properties, for each map included in the narrower subset of candidate maps, to determine, from among the narrower subset of candidate maps, the given map.

In some versions of those implementations, determining the given map based on at least the additional portion of the output, and from among the narrower subset of candidate maps, may further include, in response to determining that comparing the one or more semantic properties to one or more stored semantic properties does not result in a determination of the given map: processing, using a fine feature matching algorithm or model, the local features of the environment of the user and/or the keypoint detection scores associated with the local features of the environment of the user to determine, from among the narrower subset of candidate maps, the given map.

In some implementations, a method implemented by one or more processors is provided, and includes: obtaining vision data that captures an environment of a user of a client device, the vision data being generated by one or more vision components of the client device of the user; processing, using one or more machine learning (ML) models, the vision data to determine one or more semantic properties of the environment of the user; determining, based on one or more of the semantic properties of the environment of the user, a given map, and from a superset of candidate maps, corresponding to the environment of the user; and causing the given map corresponding to the environment of the user to be utilized as an operational map.

These and other implementations of technology disclosed herein can optionally include one or more of the following features.

In some implementations, determining the given map corresponding to the environment of the user based on one or more of the semantic properties of the environment of the user, and from the superset of candidate maps, may include: comparing the one or more semantic properties to one or more stored semantic properties, for each map included in the superset of candidate maps, to determine, from among the superset of candidate maps, the given map.

In some implementations, determining the given map corresponding to the environment of the user based on one or more of the semantic properties of the environment of the user, and from the superset of candidate maps, may include: determining a subset of candidate maps, based on location data associated with the client device of the user or based on user input received, via a software application that is accessible by the client device of the user, and from among the superset of candidate maps, that are predicted to correspond to an environment of a user of a client device; and comparing the one or more semantic properties to one or more stored semantic properties, for each map included in the subset of candidate maps, to determine, from among the superset of candidate maps, the given map.

In some implementations, the one or more ML models may include a door detection model, the one or more semantic properties may include one or more of: one or more doors detected in the environment of the user, sizes and/or orientations of the one or more doors detected in the environment of the user, or a quantity of the one or more doors detected in the environment of the user, and determining the given map corresponding to the environment of the user based on one or more of the semantic properties of the environment of the user, and from the superset of candidate maps, may include: comparing the one or more semantic properties to one or more stored semantic properties, for each map included in the superset of candidate maps, to determine, from among the superset of candidate maps, and based on the one or more doors in the environment of the user, the given map.

In some implementations, the one or more ML models may include a lux detection model, the one or more semantic properties may include a lux of one or more lights in the environment of the user, and determining the given map corresponding to the environment of the user based on one or more of the semantic properties of the environment of the user, and from the superset of candidate maps, may include: comparing the one or more semantic properties to one or more stored semantic properties, for each map included in the superset of candidate maps, to determine, from among the superset of candidate maps, and based on the lux of the one or more lights in the environment of the user, the given map.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
    determining a subset of candidate maps, from among a superset of candidate maps, that are predicted to correspond to an environment of a user of a client device;
    obtaining vision data that captures the environment of the user, the vision data being generated by one or more vision components of the client device of the user;
    determining, based on processing the vision data that captures the environment of the user, and from among the subset of candidate maps, a given map corresponding to the environment of the user, wherein determining the given map corresponding to the environment of the user based on processing the vision data that captures the environment of the user, and from among the subset of candidate maps, comprises:
        processing, using a machine learning (ML) model, the vision data to generate output, wherein the ML model is a feature extraction model, and wherein the output generated based on processing the vision data using the ML model comprises: global features of the environment of the user, local features of the environment of the user, and corresponding keypoint detection scores associated with the global features of the environment of the user and the local features of the environment of the user;
        determining, based on at least a portion of the output, and from among the subset of candidate maps, a narrower subset of candidate maps, wherein determining the narrower subset of candidate maps based on at least the portion of the output, and from among the subset of candidate maps, comprises:
            processing, using a rough feature matching algorithm or model, the global features of the environment of the user and the corresponding keypoint detection scores associated with the global features of the environment of the user to determine, from among the subset of candidate maps, the narrower subset of candidate maps; and
        determining, based on at least an additional portion of the output, and from among the narrower subset of candidate maps, the given map, wherein determining the given map based on at least the additional portion of the output, and from among the narrower subset of candidate maps, comprises:
            processing, using a fine feature matching algorithm or model, the local features of the environment of the user and the corresponding keypoint detection scores associated with the local features of the environment of the user to determine, from among the narrower subset of candidate maps, the given map,
            wherein a quantity of the local features that are processed using the fine feature matching algorithm or model is treater than a quantity of the global features that are processed using the rough feature matching algorithm or model; and
    causing the given map corresponding to the environment of the user to be utilized as an operational map.

2. The method of claim 1, wherein determining the given map based on the additional portion of the output, and from among the narrower subset of candidate maps, is in response to determining that the narrower subset of candidate maps includes multiple candidate maps.

3. The method of claim 2, further comprising:
    determining that the narrower subset of candidate maps includes a single candidate map; and
    in response to determining that the narrower subset of candidate maps includes the single candidate map:
        refraining from determining, based on the additional portion of the output, and from among the narrower subset of candidate maps, the given map; and
        determining the single candidate map is the given map corresponding to the environment of the user.

4. The method of claim 1, wherein determining the subset of candidate maps that are predicted to correspond to the environment of the user of the client device, and from among the superset of candidate maps, comprises:
    obtaining location data associated with the client device of the user, the location data being generated by one or more location sensors of the client device of the user; and
    determining, based on the location data associated with the client device of the user, the subset of candidate maps that are predicted to correspond to the environment of the user of the client device, and from among the superset of candidate maps.

5. The method of claim 1, wherein determining the subset of candidate maps that are predicted to correspond to the environment of the user of the client device, and from among the superset of candidate maps, comprises:
obtaining, via the client device of the user, user input the user input being generated by one or more user input interfaces of the client device of the user; and
determining, based on the user input obtained via the client device of the user, the subset of candidate maps that are predicted to correspond to the environment of the user of the client device, and from among the superset of candidate maps.

6. The method of claim 1, wherein causing the given map corresponding to the environment of the user to be utilized as the operational map comprises:
causing the operational map to be utilized by the client device of the user to provide the user with navigational directions from a current location of the user in the environment and to a given point of interest in the environment that is specified by the user via the client device of the user.

7. The method of claim 1, wherein causing the given map corresponding to the environment of the user to be utilized as the operational map comprises:
causing the operational map to be utilized by the client device of the user to provide the user with information related to a plurality of points of interest in the environment.

8. The method of claim 1, further comprising:
prior to determining the subset of candidate maps that are predicted to correspond to the environment of the user of the client device, and from among the superset of candidate maps:
generating each map that is included in the superset of candidate maps, the superset of candidate maps including the given map corresponding to the environment of the user and a plurality of additional maps of other environments.

9. The method of claim 8, wherein generating the given map comprises:
obtaining mapping vision data that captures the environment of the user, the mapping vision data being generated by one or more additional vision components, and the one or more additional vision components being associated with: an additional user that is manually traversing through the environment of the user, or a robot that is autonomously or semi-autonomously traversing through the environment of the user;
generating, based on the mapping vision data, the given map corresponding to the environment of the user; and
augmenting the given map corresponding to the environment of the user with information related to points of interest included in the environment of the user.

10. The method of claim 9, wherein augmenting the given map corresponding to the environment of the user with information related to the points of interest included in the environment of the user comprises obtaining user input that:
labels the points of interest in the environment of the user;
provides various levels of information about the points of interest in the environment of the user;
assigns semantic properties to the points of interest in the environment;
magnifies one or more obstacles in the environment of the user; or
draws shapes around one or more of the obstacles in the environment of the user.

11. The method of claim 1, wherein the environment of the user corresponds to an indoor environment of a building, and wherein each of the subset of candidate maps are associated with: the building, a corresponding floor of the building, a portion of the corresponding floor of the building, or an outdoor environment that surrounds the building.

12. The method of claim 1, further comprising:
obtaining additional vision data that captures a subsequent environment of the user, the vision data being generated by one or more of the vision components of the client device of the user;
determining, based on processing the additional vision data that captures the subsequent environment of the user, and from among the subset of candidate maps, whether to continue utilizing the given map as the operational map for the subsequent environment of the user or to utilize an additional given map as the operational map for the subsequent environment of the user; and
causing, based on the determination, the given map or the additional given map to be utilized as the operational map for the subsequent environment of the user.

13. A system comprising:
one or more processors; and
memory storing instructions that, when executed by the one or more processors, cause the one or more processors to:
determine a subset of candidate maps, from among a superset of candidate maps, that are predicted to correspond to an environment of a user of a client device;
obtain vision data that captures the environment of the user, the vision data being generated by one or more vision components of the client device of the user;
determine, based on processing the vision data that captures the environment of the user, and from among the subset of candidate maps, a given map corresponding to the environment of the user, wherein, in determining the given map corresponding to the environment of the user based on processing the vision data that captures the environment of the user, and from among the subset of candidate maps, the one or more processors are to:
process, using a machine learning (ML) model, the vision data to generate output, wherein the ML model is a feature extraction model, and wherein the output generated based on processing the vision data using the ML model comprises: global features of the environment of the user, local features of the environment of the user and corresponding keypoint detection scores associated with the global features of the environment of the user and the local features of the environment of the user;
determine, based on at least a portion of the output, and from among the subset of candidate maps, a narrower subset of candidate maps, wherein, in determining the narrower subset of candidate maps based on at least the portion of the output, and from among the subset of candidate maps, the one or more processors are to:
process, using a rough feature matching algorithm or model, the global features of the environment of the user and the corresponding keypoint detection scores associated with the global features of the environment of the user to determine, from among the subset of candidate maps, the narrower subset of candidate maps; and determine, based on at least an additional portion of the output, and from among the narrower subset of candidate maps, the given map, wherein, in determining the given map based on at least the additional portion of the output and from among the narrower subset of candidate maps, the one or more processors are to:

process, using a fine feature matching algorithm or model, the local features of the environment of the user and the corresponding keypoint detection scores associated with the local features of the environment of the user to determine, from among the narrower subset of candidate maps, the given map, wherein a quantity of the local features that are processed using the fine feature matching algorithm or model is greater than a quantity of the global features that are processed using the rough feature matching algorithm or model; and cause the given map corresponding to the environment of the user to be utilized as an operational map.

14. The system of claim 13, wherein determining the given map based on the additional portion of the output, and from among the narrower subset of candidate maps, is in response to determining that the narrower subset of candidate maps includes multiple candidate maps.

15. The system of claim 14, wherein the one or more processors are further to:
determine that the narrower subset of candidate maps includes a single candidate map;
in response to determining that the narrower subset of candidate maps includes the single candidate map:
refrain from determining, based on the additional portion of the output, and from among the narrower subset of candidate maps, the given map; and
determine the single candidate map is the given map corresponding to the environment of the user.

16. The system of claim 13, wherein, in determining the subset of candidate maps that are predicted to correspond to the environment of the user of the client device, and from among the superset of candidate maps, the one or more processors are to:
obtain location data associated with the client device of the user, the location data being generated by one or more location sensors of the client device of the user; and
determine, based on the location data associated with the client device of the user, the subset of candidate maps that are predicted to correspond to the environment of the user of the client device, and from among the superset of candidate maps.

17. The system of claim 13, wherein, in determining the subset of candidate maps that are predicted to correspond to the environment of the user of the client device, and from among the superset of candidate maps, the one or more processors are to:
obtain, via the client device of the user, user input the user input being generated by one or more user input interfaces of the client device of the user; and
determine, based on the user input obtained via the client device of the user, the subset of candidate maps that are predicted to correspond to the environment of the user of the client device, and from among the superset of candidate maps.

18. The system of claim 13, wherein, in causing the given map corresponding to the environment of the user to be utilized as the operational map, the one or more processors are to:
cause the operational map to be utilized by the client device of the user to provide the user with navigational directions from a current location of the user in the environment and to a given point of interest in the environment that is specified by the user via the client device of the user.

19. The system of claim 13, wherein, in causing the given map corresponding to the environment of the user to be utilized as the operational map, the one or more processors are to:
cause the operational map to be utilized by the client device of the user to provide the user with information related to a plurality of points of interest in the environment.

20. The system of claim 13, wherein the one or more processors are further to:
prior to determining the subset of candidate maps that are predicted to correspond to the environment of the user of the client device, and from among the superset of candidate maps:
generate each map that is included in the superset of candidate maps, the superset of candidate maps including the given map corresponding to the environment of the user and a plurality of additional maps of other environments.

21. The system of claim 20, wherein, in generating the given map, the one or more processors are to:
obtain mapping vision data that captures the environment of the user, the mapping vision data being generated by one or more additional vision components, and the one or more additional vision components being associated with: an additional user that is manually traversing through the environment of the user, or a robot that is autonomously or semi-autonomously traversing through the environment of the user;
generate, based on the mapping vision data, the given map corresponding to the environment of the user; and
augment the given map corresponding to the environment of the user with information related to points of interest included in the environment of the user.

22. The system of claim 21, wherein, in augmenting the given map corresponding to the environment of the user with information related to the points of interest included in the environment of the user, the one or more processors are to obtain user input that:
labels the points of interest in the environment of the user;
provides various levels of information about the points of interest in the environment of the user;
assigns semantic properties to the points of interest in the environment;
magnifies one or more obstacles in the environment of the user; or
draws shapes around one or more of the obstacles in the environment of the user.

23. A computing device comprising:
one or more processors; and
memory storing instructions that, when executed by the one or more processors, cause the one or more processors to:

determine a subset of candidate maps, from among a superset of candidate maps, that are predicted to correspond to an environment of a user of a client device;
obtain vision data that captures the environment of the user, the vision data being generated by one or more vision components of the client device of the user;
determine, based on processing the vision data that captures the environment of the user, and from among the subset of candidate maps, a given map corresponding to the environment of the user, wherein, in determining the given map corresponding to the environment of the user based on processing the vision data that captures the environment of the user, and from among the subset of candidate maps, the one or more processors are to:
  process, using a machine learning (ML) model, the vision data to generate output, wherein the ML model is a feature extraction model, and wherein the output generated based on processing the vision data using the ML model comprises: global features of the environment of the user, local features of the environment of the user, and corresponding keypoint detection scores associated with the global features of the environment of the user and the local features of the environment of the user;
  determine, based on at least a portion of the output, and from among the subset of candidate maps, a narrower subset of candidate maps, wherein, in determining the narrower subset of candidate maps based on at least the portion of the output, and from among the subset of candidate maps, the one or more processors are to:
    process, using a rough feature matching algorithm or model, the global features of the environment of the user and the corresponding keypoint detection scores associated with the global features of the environment of the user to determine, from among the subset of candidate maps, the narrower subset of candidate maps; and
  determine, based on at least an additional portion of the output, and from among the narrower subset of candidate maps, the given map, wherein, in determining the given map based on at least the additional portion of the output, and from among the narrower subset of candidate maps, the one or more processors are to:
    process, using a fine feature matching algorithm or model, the local features of the environment of the user and the corresponding keypoint detection scores associated with the local features of the environment of the user to determine, from among the narrower subset of candidate maps, the given map,
      wherein a quantity of the local features that are processed using the fine feature matching algorithm or model is greater than a quantity of the global features that are processed using the rough feature matching algorithm or model; and
cause the given map corresponding to the environment of the user to be utilized as an operational map.

24. A non-transitory computer-readable storage medium storing instructions that, when executed by one or more processors, cause the one or more processors to perform operations, the operations comprising:
determining a subset of candidate maps, from among a superset of candidate maps, that are predicted to correspond to an environment of a user of a client device;
obtaining vision data that captures the environment of the user, the vision data being generated by one or more vision components of the client device of the user;
determining, based on processing the vision data that captures the environment of the user, and from among the subset of candidate maps, a given map corresponding to the environment of the user, wherein determining the given map corresponding to the environment of the user based on processing the vision data that captures the environment of the user, and from among the subset of candidate maps, comprises:
  processing, using a machine learning (ML) model, the vision data to generate output, wherein the ML model is a feature extraction model, and wherein the output generated based on processing the vision data using the ML model comprises: global features of the environment of the user, local features of the environment of the user, and corresponding keypoint detection scores associated with the global features of the environment of the user and the local features of the environment of the user;
  determining, based on at least a portion of the output, and from among the subset of candidate maps, a narrower subset of candidate maps, wherein determining the narrower subset of candidate maps based on at least the portion of the output, and from among the subset of candidate maps, comprises:
    processing, using a rough feature matching algorithm or model, the global features of the environment of the user and the corresponding keypoint detection scores associated with the global features of the environment of the user to determine, from among the subset of candidate maps, the narrower subset of candidate maps; and
  determining, based on at least an additional portion of the output, and from among the narrower subset of candidate maps, the given map, wherein determining the given map based on at least the additional portion of the output, and from among the narrower subset of candidate maps, comprises:
    processing, using a fine feature matching algorithm or model, the local features of the environment of the user and the corresponding keypoint detection scores associated with the local features of the environment of the user to determine, from among the narrower subset of candidate maps, the given map,
      wherein a quantity of the local features that are processed using the fine feature matching algorithm or model is greater than a quantity of the global features that are processed using the rough feature matching algorithm or model; and
causing the given map corresponding to the environment of the user to be utilized as an operational map.

* * * * *